US012337967B2

(12) United States Patent
Collins et al.

(10) Patent No.: US 12,337,967 B2
(45) Date of Patent: Jun. 24, 2025

(54) AERIAL DELIVERY SYSTEM

(71) Applicant: IrvinGQ LIMITED, Bridgend Mid Glamorgan (GB)

(72) Inventors: Gareth Collins, Bridgend (GB); Adam Sambrook, Bridgend (GB); Richard Anthony Laws, Bridgend (GB); Stuart Strathdee, Bridgend (GB)

(73) Assignee: IRVINGQ LIMITED, Bridgend (GB)

( * ) Notice: Subject to any disclaimer, the term of this patent is extended or adjusted under 35 U.S.C. 154(b) by 0 days.

(21) Appl. No.: 18/510,538

(22) Filed: Nov. 15, 2023

(65) Prior Publication Data
US 2024/0174357 A1 May 30, 2024

(30) Foreign Application Priority Data

Nov. 29, 2022 (GB) ..................................... 2217887
Aug. 18, 2023 (EP) ..................................... 23192085

(51) Int. Cl.
*B64D 1/12* (2006.01)
*B64D 17/38* (2006.01)

(52) U.S. Cl.
CPC ............. *B64D 1/12* (2013.01); *B64D 17/38* (2013.01)

(58) Field of Classification Search
CPC ........... B64D 1/12; B64D 17/38; B64D 17/64
See application file for complete search history.

(56) References Cited

U.S. PATENT DOCUMENTS 3,257,089 A * 6/1966 Samms ................... B64D 1/02
 244/151 R
3,642,235 A   2/1972 Criley et al.
3,670,999 A * 6/1972 Leger ..................... B64D 1/10
 244/137.3

(Continued)

FOREIGN PATENT DOCUMENTS

EP    3293116 A   3/2018
GB    2553552 A   3/2018

OTHER PUBLICATIONS

Aerial Delivery Directorate, U.S. Army 2019 Catalog.
(Continued)

*Primary Examiner* — Richard Green
(74) *Attorney, Agent, or Firm* — LeonardPatel PC; Sheetal S. Patel; Michael A. Leonard, II

(57) ABSTRACT

An aerial delivery system carrying cargo from an aircraft to ground includes a platform for supporting the cargo; a main parachute for carrying the platform when the platform has exited the aircraft, is airborne, and the main parachute is deployed; a main parachute deployment line to deploy the main parachute, an extraction parachute coupled to the platform and arranged for generating a drag force and exerting the drag force on the platform; and a coupling arrangement switchable between an open configuration where the main parachute deployment line is uncoupled from the extraction parachute and a closed configuration where the main parachute deployment line is coupled to the extraction parachute. When the extraction parachute exerts the drag force on the platform, the coupling arrangement is initially in the open configuration until the coupling arrangement is switched to the closed configuration to couple the main parachute deployment line to the extraction parachute.

20 Claims, 16 Drawing Sheets

(56) References Cited

U.S. PATENT DOCUMENTS

| | | | | |
|---|---|---|---|---|
| 3,781,055 | A | * | 12/1973 | Keich ................ B64D 17/383 |
| | | | | 294/82.31 |
| 3,865,333 | A | * | 2/1975 | Fielding ................ B64D 17/38 |
| | | | | 244/137.3 |
| 5,284,310 | A | | 2/1994 | Conway, Jr. |
| 5,697,581 | A | * | 12/1997 | Conroy ................ B64D 1/12 |
| | | | | 244/137.3 |
| 6,241,190 | B1 | | 6/2001 | Lunsford et al. |
| 8,567,724 | B2 | | 10/2013 | Parkinson |
| 10,604,256 | B2 | | 3/2020 | Gad |
| 2012/0280085 | A1 | | 11/2012 | Sinclair et al. |
| 2015/0210390 | A1 | | 7/2015 | Gad et al. |

OTHER PUBLICATIONS

Airdrop of Supplies and Equipment: Rigging Airdrop Platforms.
Bracket Assembly Release Cargo Platform (BARCP) Mk 2, Chapter 1.2.7.
EPJS Extraction Parachute Jettison System.
Extended European Search Report, issued Feb. 6, 2024, EP Patent Application No. 23192085.1.
Extraction Force Transfer Coupling (EFTC) Datasheet, Capewell Aerial Systems LLC.
Extractor Parachute Emergency Release System (EPERS), Puribad, Chapter 1-6-3.
Extractor Parachute Emergency Release Unit (EPERU), Chapter 1.2.20.
Search Report Under Section 17(5), issued May 16, 2023, GB2217887.5.

* cited by examiner

1

AERIAL DELIVERY SYSTEM

CROSS-REFERENCE TO RELATED APPLICATIONS

This application claims priority to United Kingdom Patent Application No. GB 2217887.5, filed Nov. 29, 2022, and European Patent Office Application No. 23192085.1, filed Aug. 18, 2023.

FIELD OF THE INVENTION

The present invention relates to an aerial delivery system for use during aerial delivery of cargo; the cargo being provided on an aerial delivery platform which may be delivered by a military aircraft. The invention also concerns an extraction assembly for an aerial delivery system, an aircraft comprising the extraction assembly or the aerial delivery system, and a method of operating an aerial delivery system.

BACKGROUND OF THE INVENTION

It is known to deliver cargo by aircraft. The cargo can be delivered by performing an air drop comprising deploying the cargo from the aircraft using an aerial delivery system. The cargo can be deployed from the aircraft by extracting a platform on which the cargo is supported using a drag force on the aircraft as generated by an extraction parachute. The extraction parachute can be released out the back of the aircraft and is coupled to the platform by a transfer coupling and a jettison device (used for jettisoning the extraction parachute in isolation from the platform in an emergency). The drag force generated by the extraction parachute through the transfer coupling and the jettison device causes the extraction parachute to pull the platform out of the aircraft. When the platform has moved a required distance (normally when it has reached an aft end (rear) of a ramp at a back of the aircraft), a jaw mechanism, being part of the transfer coupling, is released. Releasing the jaw mechanism releases the jettison device and the extraction parachute from the platform and transfers the drag force to deploy the main parachutes via a riser coupled to the jettison device.

Unfortunately, on some occasions, the jaw mechanism can open prematurely. This causes the extraction parachute to be released and deploy the main parachutes while the platform is still within the aircraft. This malfunction may lead to a "main canopy extraction" at a higher speed, and perhaps with a rotation component, with an associated risk of damage to the aircraft.

GB2553552A discloses a safety link assembly for an aerial delivery apparatus. The safety link assembly is provided between a platform and a jaw mechanism and is intended to prevent premature release of a connection between the platform and an extraction parachute whilst assuring a prompt release when required. The disclosure shows the use of two connection paths from the safety link assembly, wherein one of the connection paths comprises a strop line. The strop line is used in the failsafe operation of the jaw mechanism, for example, when the jaw mechanism is released too early and the drag force between the extraction parachute and the platform can then be carried by the strop line. It has been found that the use of the safety link assembly, the jaw mechanism, and the strop line is complex and bulky. It is desirable to provide a simplified aerial delivery system that may additionally or alternatively offer weight and/or space savings.

2

The present invention seeks to mitigate the above-mentioned problems. Alternatively or additionally, the present invention seeks to provide an improved aerial delivery system, an extraction assembly for an aerial delivery system, and/or method of operating an aerial delivery system.

SUMMARY OF THE INVENTION

The present invention provides, according to a first aspect, an aerial delivery system for carrying cargo from an aircraft to ground. The aerial delivery system may comprise a platform for supporting the cargo. The aerial delivery system may comprise a main parachute for carrying the platform when the platform has exited the aircraft and is airborne and the main parachute is deployed. The aerial delivery system may comprise a main parachute deployment line to deploy the main parachute. The aerial delivery system may comprise an extraction parachute. The extraction parachute may be coupled to the platform and arranged for generating a drag force and exerting the drag force on the platform. The platform may be arranged to move within the aircraft, under the action of the drag force, before (and typically as a necessary step) exiting the aircraft.

The aerial delivery system may comprise a coupling arrangement. The coupling arrangement may be switchable from a first configuration (for example, an open configuration) in which the main parachute deployment line is uncoupled from (i.e. not coupled to) the extraction parachute, and a second configuration (for example, a closed configuration) in which the main parachute deployment line is coupled to the extraction parachute. The aerial delivery system may be configured such that, when the extraction parachute exerts the drag force on the platform, the coupling arrangement is initially in the first/open configuration until the coupling arrangement is switched to the second/closed configuration to couple the main parachute deployment line to the extraction parachute.

It will be appreciated that, when the drag force is exerted on the platform, and the coupling arrangement is in the open configuration, a release of the extraction parachute preferably does not cause deployment of the main parachute; and when the drag force is exerted on the platform, and the coupling arrangement is in the closed configuration, a release of the extraction parachute preferably causes deployment of the main parachute.

Aerial delivery systems in accordance with embodiments of the present invention, may reduce the risk of the main parachute opening too soon, such as while the platform and/or main parachute are/is in the aircraft, by keeping the main parachute deployment line uncoupled from the extraction parachute during extraction of the platform until the moment that the main parachute deployment is required to be coupled to the extraction parachute. Such aerial delivery systems may improve safety and/or may provide for a simplified system.

The main parachute may comprise a single parachute or multiple parachutes. When comprising multiple parachutes, the main parachute may be referred to as a main parachute pack comprising multiple main parachutes. The extraction parachute may comprise a single parachute or multiple parachutes.

The platform may comprise a cargo surface onto which cargo is received. The cargo surface may be substantially planar. The platform may be substantially planar. The platform may be referred to as an aerial delivery platform. An example platform is the ATAX® platform manufactured by IrvinGQ Limited (United Kingdom).

The aircraft will typically comprise a cargo handling system on which the platform can be moved within the cargo bay (cargo area) of the aircraft. The cargo handling system may comprise features on the floor of the cargo bay, such as rails, rollers, tie down points and/or locks, which can be used to control and/or assist the movement of the platform. The aircraft will typically be a fixed wing aircraft. An example aircraft is the Airbus A400M.

The coupling arrangement may comprise a first coupling portion coupleable to a second coupling portion. In the open configuration of the coupling arrangement, the first coupling portion is uncoupled from the second coupling portion. In the closed configuration of the coupling arrangement, the first coupling portion is coupled to the second coupling portion.

The first coupling portion may be configured such that an extraction line coupled to the extraction parachute can be wound around and restrained by the first coupling portion. The first coupling portion may comprise an interface, for example a curve surface, to interface with the extraction line.

The second coupling portion may be configured such that the main parachute deployment line can be wound around and restrained by the second coupling portion. The second coupling portion may comprise an interface, for example a curve surface, to interface with the main parachute deployment line.

The first coupling portion (or second coupling portion) may comprise a formation. The second coupling portion (or first coupling portion) may comprise a corresponding formation. The formation and corresponding formation may engage when the coupling arrangement is in the closed configuration and disengage when the coupling arrangement is in the open configuration. The coupling arrangement may be associated with, or may comprise, a bias arrangement to bias the formation and corresponding formation into engagement.

The formation may be in the form of a lug. The corresponding formation may be in the form of a recess. The recess may be an aperture, for example a hole. The recess may comprises a larger portion through which the lug may pass, and a smaller portion into which the lug may be held (i.e. be unable to pass through) upon relative movement of the lug and the recess upon release of the extraction parachute. The recess may have an oval shape. The formation and/or corresponding formation may be formed on/in an arm/leg. The arm/leg may be pivotally mounted. The bias arrangement may bias the arm/leg to a position in which the formation is engaged with the corresponding formation, for example the lug is engaged with the recess. There may be a plurality of such formations and corresponding formations.

There may be a plurality of arms/legs which are arranged to move interdependently, for example such that each formation engages with the respective corresponding formation at the same time. Each arm/leg may comprise one or more cam lobes (or the like gears) which engage with cam lobes (or the like gears) on another arm/leg to provide said interdependent movement. This may reduce the number of biases required to move all such arms/legs, which may simplify the arrangement.

The second coupling portion (or first coupling portion) may comprise a clasp to retain the first coupling portion (or second coupling portion) when the coupling arrangement is in the closed configuration and to release the first coupling portion when the coupling arrangement is in the open configuration. The coupling arrangement may be associated with, or may comprise, a bias arrangement to bias the clasp closed. The clasp may be formed by the above mentioned lug(s) and recess(es).

The aerial delivery system may comprise a coupling device to switch the coupling arrangement from the open configuration to the closed configuration. The coupling device may be a mechanical device that automatically switches the coupling arrangement from the open configuration to the closed configuration once certain criteria are met, for example when the platform has moved beyond a certain position in the aircraft.

The coupling device may be configured to switch the coupling arrangement from the open configuration to the closed configuration at a first point during extraction of the platform from the aircraft. The first point may be when the platform is at a first predetermined position relative to the aircraft. The first predetermined position is a position reached by the platform after the platform has moved from its initial position under the drag force exerted by the extraction parachute.

The coupling device may comprise a coupling device lever that is operable under a bias force such that the coupling device lever causes the coupling arrangement to switch from the open configuration to the closed configuration when the bias force on the coupling device lever causes the coupling device lever to move beyond a predetermined position (e.g. pivot beyond a predetermined angle). This may happen in dependence on the position of the platform, as the platform moves prior to exit of the platform from the aircraft.

The coupling device lever may be movable between a first configuration and a second configuration, wherein movement of the coupling device lever from the first configuration to the second configuration causes the coupling arrangement to switch from the open configuration to the closed configuration. The bias force may urge the coupling device lever to move (e.g. rotate) from the first configuration to the second configuration.

The coupling device lever may be a drop arm. The drop arm may be rotatably mounted. Prior to the platform reaching the first predetermined position, the drop arm may make contact with a structure (for example an underlying structure such as the cargo bay floor or a rail of the cargo handling system) which prevents the drop arm from moving from the first configuration to the second configuration. When the platform reaches the first predetermined position, a distance between the coupling device and said structure may change, and/or contact between the drop arm and said structure may be broken, such that the drop arm is able to move from the first configuration to the second configuration. The first predetermined position may be a position at which the drop arm exits the aircraft, for example at a distal end of a cargo bay door.

The coupling device lever may be configured to actuate a cam mechanism upon movement of the coupling device lever. Actuation of the cam mechanism may cause the coupling arrangement to switch from the open configuration to the closed configuration. For example, actuation of the cam mechanism may cause engagement of the formation and corresponding formation of the coupling arrangement. For example, actuation of the cam mechanism may allow the arm/leg to move such that the lug is engaged with the recess. Actuation of the cam mechanism may cause the clasp to close. The cam mechanism may be associated with, or may comprise, a push rod which retracts into a housing thereby allowing engagement of the formation and corresponding formation under the action of the bias arrangement.

The aerial delivery system may comprise an extraction parachute release device to uncouple the extraction parachute from the platform. The extraction parachute release device may be arranged such that it is able to uncouple the extraction parachute from the platform when the coupling arrangement is in the open configuration such that release of the extraction parachute does not deploy the main parachute. It has been found that the use of a normally open connection between the main parachute deployment line and the extraction parachute can improve safety, for example because the extraction parachute release device can be activated early without risk of deploying the main parachute prematurely. The extraction parachute release device may be arranged such that it is able to uncouple the extraction parachute from the platform when the coupling arrangement is in the closed configuration such that release of the extraction parachute deploys the main parachute via the coupling arrangement and the main parachute deployment line. Accordingly, the extraction parachute release device may be arranged such that it is able to uncouple the extraction parachute from the platform when the coupling arrangement is in either the open configuration or the closed configuration.

The extraction parachute release device may be or may comprise a mechanical mechanism to release the extraction parachute by mechanical means. The mechanical mechanism may comprise a plurality (e.g. a series) of interconnected link arms. Use of a mechanical mechanism may be beneficial because may it simplify operation. The mechanical mechanism may avoid the use of pyrotechnics that may be used to free the extraction parachute from the platform, for example, a pyrotechnic cutter comprising a cutter to cut through an extraction line coupled to the extraction parachute, and a detonator to actuate the cutter and operable using pyrotechnic energy. The mechanical mechanism may avoid the use of electronics. The extraction parachute release device may be operable without pyrotechnics and/or electronics.

Prior to release of the extraction parachute, the drag force generated by the extraction parachute may be exerted on the platform via the first coupling portion of the coupling arrangement. The extraction parachute release device may be configured to selectively retain and release the first coupling portion. The extraction parachute release device may comprise a closed configuration wherein the extraction parachute release device retains the first coupling portion of coupling arrangement (such that the extraction parachute is coupled to the platform) (and such that drag force generated by the extraction parachute is exerted on the platform via the first coupling portion). The extraction parachute release device may comprise an open configuration wherein the extraction parachute release device releases (i.e. does not retain) the first coupling portion of the coupling arrangement (such that the extraction parachute is uncoupled/released from the platform).

It will be appreciated that if the extraction parachute release device releases the first coupling portion before it has been coupled to the second coupling portion, then only the first coupling portion will be extracted by the extraction parachute and the main parachute will not be deployed.

The extraction parachute release device may retain the first coupling portion by directly engaging with the first coupling portion. The extraction parachute release device may comprise a lever assembly configured such that in the closed configuration of the extraction parachute release device the lever assembly retains the first coupling portion, and in the open configuration of the extraction parachute release device the lever assembly releases the first coupling portion.

The lever assembly may comprise a lever comprising a formation, and the first coupling portion may comprise a corresponding formation. In the closed configuration of the extraction parachute release device, the formation may engage with the corresponding formation and retain the first coupling portion. In the open configuration of the extraction parachute release device, the formation may be disengaged from the corresponding formation and release the first coupling portion. The formation may be a male member such as a projection (e.g. a lug), and the corresponding formation may be a female member such as a recess, or vice versa.

The lever assembly may comprise a plurality of the levers which retain the first coupling portion. For example, the lever assembly may comprise a pair of levers in the form of a pair of pivotally mounted jaws. The jaws may be configured to (in a closed position) engage with the first coupling portion so as to retain the first coupling portion, and to (in an open position) disengage from the first coupling portion so as to release the first coupling portion. The jaws may be configured to engage and disengage by pivoting towards and away from each other. The jaws may be resiliently biased away from a position in which they retain the first coupling portion. The pair of jaws may form a calliper. There may be two callipers to retain the first coupling portion.

The extraction parachute release device may comprise a locking device configured to lock the extraction parachute release device in the closed configuration, and to unlock so that the extraction parachute release device can move to the open configuration. The locking device may comprise a locked configuration in which it is configured to keep the lever assembly in a position in which it retains the first coupling portion. For example, in the locked configuration the locking device may be configured to keep the jaws in the closed position. The locking device may be an over centre locking device.

The lever assembly may be connected to the locking device. The locking device may comprise a series of interconnected pivotal lever arms. The series of interconnected pivotal lever arms may comprise two lever arms, a first of the lever arms being a link arm which at one end is pivotally mounted to the lever which retains the first coupling portion, and which at a second end is pivotally mounted to a second of the lever arms. The second lever arm may be pivotally mounted at one end to the link arm, and pivotally mounted at another point to a fixed point, such as to a body associated with the extraction parachute release device. The second lever arm may act as crank, such that a rotational position of the second lever arm determines the position of the link arm, and in turn, the position of the lever which retains the coupling arrangement.

Where the lever assembly comprises a plurality of levers which retain the first coupling portion, the series of interconnected pivotal lever arms may be connected to each of the levers such that the levers move synchronously from a position in which they retain the first coupling portion to a position in which the first coupling portion is released.

When the levers form a pair of jaws, there may be a link arm connected to each jaw. Both link arms may be connected to the same second lever arm, which may take the form of a central lever arm and may extend either side of its pivot. The central lever arm may act as a crank so both jaws open and close together. There may be a stack of central lever arms.

The locking device may comprise a locking member. In the locked configuration, the locking member may be in a first position in which it is configured to keep the series of interconnected pivotal lever arms in an over centre position. In the over centre position, the force exerted on the lever assembly as a result of the drag force may act to keep the series of interconnected pivotal lever arms locked against the locking member, and as a result act to keep the lever assembly in a position in which it retains the first coupling portion.

The locking member may be configured such that, when the locking member moves to a second position, the series of interconnected pivotal lever arms passes over centre. When the over centre position is passed, the force exerted on the lever assembly as a result of the drag force may act to move the series of interconnected pivotal lever arms in a direction which allows the lever assembly to release the coupling arrangement.

In the locked configuration, the locking member may prevent the second lever arm from rotating. When the locking member moves to the second position, the locking member may push the second lever arm such that the second lever arm rotates around the pivot in a direction which causes the series of interconnected pivotal lever arms to pass over centre.

The extraction parachute release device may be arranged to uncouple the extraction parachute from the platform in response to receiving a release force. The extraction parachute release device may be configured to receive the release force via a cable, for example via an inner force transmitting line of a Bowden cable.

The release force may move the locking device from the locked configuration to the unlocked configuration. The release force may move the locking member from the first position to the second position. The release force may act on the locking member via a pivotally mounted activation arm. The activation arm may be attached at one end to the cable, and at a second end to the locking member. The locking member may be a pin which is slidably mounted in a slot, for example an arcuate slot. The release force may cause the pin to slide within the slot (and move from the first position to the second position).

The aerial delivery system may comprise an extraction assembly. The extraction assembly may comprise the coupling arrangement, coupling device, and/or the extraction parachute release device. The extraction assembly may comprise a body to which the coupling arrangement, coupling device, and/or the extraction parachute release device are attached and/or supported. The extraction assembly may be mountable to the platform, for example mountable to the platform such that the extraction assembly is movable in two degrees of freedom with respect to the platform.

The aerial delivery system may comprise an extraction parachute release assembly. The extraction parachute release assembly may be arranged to actuate the extraction parachute release device. The extraction parachute release assembly may be arranged to cause the extraction parachute release device to uncouple the extraction parachute from the platform. The extraction parachute release assembly may be arranged to transmit the release force to the extraction parachute release device, for example via a cable, for example via an inner force transmitting line of a Bowden cable.

The extraction parachute release assembly may be configured such that it is able to cause the extraction parachute release device to uncouple the extraction parachute from the platform at a second point during extraction of the platform from the aircraft. The second point is subsequent to the first point. The second point may be when the platform is at a second predetermined position relative to the aircraft. The second predetermined position is a position reached by the platform after the platform has passed the first predetermined position.

The extraction parachute release assembly may be configured such that it is able to cause the extraction parachute release device to uncouple the extraction parachute from the platform in response to an input from a jettison assembly. Release in response to the input from the jettison assembly may be effected prior to the second point during extraction of the platform from the aircraft, for example prior to the platform reaching the second predetermined position relative to the aircraft.

The extraction parachute release assembly may take the form of a known Extraction Force Transfer Actuator (EFTA) which forms part of a known Extraction Force Transfer Coupling (EFTC) assembly of the prior art.

Optionally, the extraction parachute release assembly comprises a trigger assembly. The trigger assembly may comprise a trigger spring, a releasable member and a trigger. The trigger assembly may comprise an armed configuration in which the releasable member is held in an armed positon against a bias force of the trigger spring. In the armed configuration, the trigger may engage with the releasable member so as to hold the releasable member in the armed position. The trigger may be pivotally mounted. The trigger may be biased into engagement with the releasable member.

The extraction parachute release assembly may comprise a first trigger release assembly which is arranged to operate the trigger. Operation of the trigger may release the releasable member such that the releasable member can move under the bias force of the trigger spring to a discharged position. Operation of the trigger may disengage the trigger from the releasable member such that the releasable member is released and can move under the bias force of the trigger spring to the discharged position.

Movement of the releasable member from the armed position to the discharged position may generate a release force for, in use, causing release of the extraction parachute from the platform. The extraction parachute release assembly may be configured to transmit the release force via a cable. The releasable member may be connected to the cable. The cable may be an inner force transmitting line of a Bowden cable. Movement of the releasable member to the discharge position may pull the inner force transmitting line relative to an outer sleeve of the Bowden cable. The release force may be received by the extraction parachute release device, for example via the cable.

The first trigger release assembly may be arranged to operate the trigger at the second point during extraction of the platform from the aircraft. The first trigger release assembly may be arranged to operate the trigger when the platform reaches the second predetermined position.

The extraction parachute release assembly may comprise a drop arm. The extraction parachute release assembly may be configured to cause the extraction parachute release device to uncouple the extraction parachute from the platform, for example by transmitting the release force, in response to rotation of the drop arm. Such rotation may occur when the platform reaches the second predetermined position.

The first trigger release assembly may comprise the drop arm. The first trigger release assembly may be arranged to operate the trigger upon movement of the drop arm from an armed position (a first position) to a discharged position (a second position). The first trigger release assembly may be arranged to operate the trigger when the drop arm passes a predetermined angle. The drop arm may be biased from the first/armed position to the second/discharged position.

The drop arm may be rotatably mounted. Prior to the platform reaching the second predetermined position, the drop arm may make contact with a structure (for example an underlying structure such as the cargo bay floor or a rail of the cargo handling system) which prevents the drop arm from moving, for example from the armed position to the discharged position. When the platform reaches the second predetermined position, a distance between the extraction parachute release assembly and said structure may change, and/or contact between the drop arm and said structure may be broken, such that the drop arm is able to move, for example from the armed position to the discharged position. The second predetermined position may be a position at which the drop arm exits the aircraft, for example at a distal end of a cargo bay door.

The drop arm may be operatively connected to a first cam which engages the trigger. The extraction parachute release assembly may be arranged such that movement of the drop arm from its armed position to its discharged position causes the first cam to move (e.g. rotate) and operate the trigger. The first cam may be provided by a cam surface on a first collar about a pivot point. The drop arm may be connected to the first collar such that the collar and drop arm rotate about the pivot point together. The first cam may operate the trigger by pushing the trigger against the bias which biases the trigger, such that the trigger moves out of engagement with the releasable member. The drop arm may be biased from the armed position to the discharged position by a resilient bias which acts via the first collar.

The extraction parachute release assembly may comprise a drop arm latch, the drop arm latch being arranged to hold the drop arm in the discharged position. Preferably, the discharged position is a position in which the drop arm does not project towards the ground during decent of the platform via the main parachute.

The extraction parachute release assembly may comprise a second trigger release assembly which is arranged to operate the trigger. The second trigger release assembly may be arranged to allow operation of the trigger before the second point during extraction of the platform from the aircraft. The second trigger release assembly may be arranged to allow operation of the trigger before the platform reaches the second predetermined position. The second trigger release assembly may be arranged to operate the trigger in response to receiving a (e.g. user initiated) release force. The extraction parachute release assembly (e.g. the second trigger release assembly thereof) may be configured to receive the release force via a cable, for example via an inner force transmitting line of a Bowden cable.

The second trigger release assembly may comprise a second cam which engages the trigger. The extraction parachute release assembly may be arranged such that receipt of the release force causes the second cam to move (e.g. rotate) and operate the trigger. The second cam may be provided by a cam surface on a second collar about a pivot point, which may be the same pivot point that the first collar is provided around. The second cam may operate the trigger by pushing the trigger against the bias which biases the trigger, such that the trigger moves out of engagement with the releasable member.

In embodiments, the second cam is (e.g. directly) connected to the cable from which the (e.g. user initiated) release force is received. In embodiments, the second trigger release assembly may comprise a force transfer latch through which the (e.g. user initiated) release force is transferred, for example in order to operate the trigger. The force transfer latch may be configured to engage and allow the transfer of the release force through the latch in response to the second trigger release assembly receiving the release force. The force transfer latch may be configured to remain disengaged in the absence of the second trigger release assembly receiving the release force. The force transfer latch may be biased to the disengaged configuration.

The force transfer latch may comprise a first latch part, for example a catch, for example a hook, which is arranged to engage with a second latch part, for example a pin, when the release force is received. The first latch part may be connected to the cable, for example an inner force transfer line of a Bowden cable, via which the release force is received. The second latch part may be operatively connected to the second cam, for example via a linkage. Movement of the second latch part may cause the second cam to operate the trigger.

The release force may pull the first latch part into engagement with the second latch part, for example the release force may pull the catch into engagement with the pin. The first latch part may slide within a channel, for example a slot. The channel may be configured such that the first latch part is initially in a first orientation in which the first latch part is disengaged from the second latch part. The channel may be configured such that the first latch part moves to a second orientation in which the first latch part can engage with the second latch part when the first latch part is pulled through the channel by the release force.

The extraction parachute release assembly may be arranged such that, when the force transfer latch is disengaged, at least part of the second trigger release assembly can remain in the aircraft when the platform leaves the aircraft. For example, the first latch part may remain in the aircraft and the second latch part may remain with the platform. This may allow the cable transmitting the release force to the second trigger release assembly to remain in the aircraft.

The extraction parachute release assembly may comprise a (further) latch mechanism in communication with a lanyard, wherein when the lanyard is pulled taught, the latch mechanism disengages and uncouples said at least part of the second trigger release assembly from a remaining part of the extraction parachute release assembly. In embodiments, the whole second trigger release assembly is uncoupled from the remaining part of the extraction parachute release assembly and remains in the aircraft. For example, the second cam may be provided on a component (e.g. a housing) which is uncoupled from the remaining part of the extraction parachute release assembly when the lanyard is pulled taught and the latch mechanism disengages. The latch mechanism may be resiliently biased towards an engaged configuration. The lanyard may be configured to attach to a fixed point in the aircraft. The lanyard may have a length which causes the latch mechanism to disengage at a third point during the extraction of the platform from the aircraft. The third point may be before the first point and/or second point. The third point corresponding to a third predetermined position of the platform and the aircraft. The third predetermined position may be before the first predetermined position and/or second predetermined position.

The extraction parachute release assembly may comprise an arming lever for arming the trigger assembly. The arming lever may be rotatable to a position in which the arming lever can move the releasable member to its armed position against the bias of the trigger spring.

The extraction parachute release device may be mounted at a first location on the platform, and the extraction parachute release assembly may be mounted at a second location on the platform. The first location may be aft of the second location, relative to a flight direction of the aircraft.

An extraction force transfer assembly may comprise the mechanical mechanism or a portion of the mechanical mechanism. The extraction parachute release device may comprise a platform lever that is operable under a bias force such that the platform lever causes the extraction parachute to be uncoupled from the platform when the bias force on the platform lever causes the platform lever to pivot beyond a predetermined angle. The platform lever may be coupled to the platform and remain coupled even when the extraction parachute is released from the platform by the extraction parachute release device with the coupling arrangement in any one of the open or closed configurations.

The aerial delivery system may comprise a jettison assembly for effecting a (e.g. user initiated) jettison of the extraction parachute from the platform. The jettison assembly may comprise a jettison initiation device, for example a jettison handle, for operation by a user. The jettison assembly may comprise a connecting block for connecting to a force transmitting cable. The jettison initiation device may be in operative engagement with the connecting block, such that operation of the jettison initiation device moves the connecting block and applies a release force to the force transmitting cable.

The jettison initiation device may be configured to generate the (e.g. user initiated) release force which is transmitted to the extraction parachute release assembly, for example to the second trigger release assembly of the extraction parachute release assembly.

The jettison assembly may be a mechanical mechanism. The jettison initiation device may be connected to the connecting block via a cable which transfers force from the jettison initiation device to the connecting block.

The jettison assembly may be suitable for operation by a user positioned remote from the platform. The jettison assembly may be suitable for mounting remotely to the platform. The jettison initiation device may be mountable to a fixed point in the aircraft. The jettison initiation device may comprise bosses for mounting to the cargo handling system of the aircraft.

The aerial delivery system may comprise or consist of a unitary load path along which the drag force travels from the extraction parachute to the platform, such that disconnection of the unitary load path removes the drag force from the extraction parachute to the platform. The coupling arrangement may be configured to divert the unitary load path to the main parachute deployment line when the coupling arrangement is in the closed configuration and the extraction parachute release device has uncoupled the extraction parachute from the platform.

The present invention provides, according to a second aspect, an extraction assembly for an aerial delivery system, for example the aerial delivery system according to the first aspect. The extraction assembly may be for connecting an extraction parachute of the aerial delivery system to a platform of the aerial delivery system. The extraction assembly may comprise a coupling arrangement switchable from a first configuration (for example, an open configuration) and a second configuration (for example, a closed configuration). The extraction assembly may be arranged to experience a drag force event. The drag force event may comprise a drag force generated by an extraction parachute and exerted on a platform via the extraction assembly. The extraction assembly may be arranged such that, during the drag force event, the coupling arrangement is switched from the open configuration to the closed configuration such that in the open configuration a main parachute deployment line is uncoupled from the extraction parachute and in the closed configuration the main parachute deployment line is coupled to the extraction parachute. It has been found that such extraction assemblies provide a safe operating solution with less bulk and/or complexity compared to alternatives.

The extraction assembly according to the second aspect may comprise any of the features set out in relation to the first aspect. For example:

The extraction assembly may comprise a coupling device to switch the coupling arrangement from the first/open configuration to the second/closed configuration. The coupling device may comprise a coupling device lever that is operable under a bias force such that the coupling device lever switches the coupling arrangement from the open configuration to the closed configuration when the bias force on the coupling device lever causes the coupling device lever to pivot beyond a predetermined angle. The coupling device may comprise a rotatable wheel to travel along a surface of the aircraft as a result of movement of the platform with respect to the aircraft under the drag force.

The extraction assembly may comprise an extraction parachute release device to uncouple the extraction parachute from the platform when the coupling arrangement is in the open configuration such that release of the extraction parachute does not deploy the main parachute. The extraction parachute release device may comprise a Bowden cable.

The coupling arrangement may comprise a first coupling portion (e.g. for connection to the extraction parachute) coupleable to a second coupling portion (e.g. for connection to the main parachute deployment line), wherein the first coupling portion is configured such that an extraction line coupled to the extraction parachute can be wound around and restrained by the first coupling portion. The first coupling portion may comprise an interface, for example a curve surface, to interface with the extraction line. The second coupling portion may comprise a clasp to retain the first coupling portion when the coupling arrangement is in the closed configuration and to release the first coupling portion when the coupling arrangement is in the open configuration. The extraction assembly may comprise a bias arrangement to bias the clasp closed.

The extraction line may be or comprise an arrangement comprising multiple lines coupled to the extraction parachute. Each of the multiple lines may transmit the drag force under tension.

The present invention provides, according to a third aspect, a method of operating an aerial delivery system, for example the aerial delivery system according to the first aspect. The method may comprise, when a drag force is generated by an extraction parachute and is exerted via an extraction assembly on a platform for carrying cargo within an aircraft, determining whether to uncouple or couple a main parachute deployment line to the extraction parachute. The main parachute may be arranged to carry the platform to ground when the platform is airborne and has exited the aircraft. The main parachute deployment line may be to deploy the main parachute, for example when the platform has exited the aircraft and is airborne.

The method may comprise, when the drag force is exerted on the platform by the extraction parachute, determining to couple and coupling the main parachute deployment line to the extraction parachute. Coupling the main parachute deployment line may occur once the drag force is sufficient to move the platform within the aircraft towards an open exit of the aircraft. Coupling the main parachute deployment line may occur when the platform has moved to a predetermined location within the aircraft by the drag force. Coupling the main parachute deployment line may occur once a coupling arrangement switches from an open configuration to a closed configuration, wherein in the open configuration the main parachute deployment line may be uncoupled from the extraction parachute, and in the closed configuration the main parachute deployment line may be coupled to the extraction parachute.

The method may comprise releasing the extraction parachute from the platform once it has been determined whether to uncouple or couple the main parachute deployment line to the extraction parachute.

The method may comprise, after coupling the main parachute deployment line, releasing the extraction parachute from the platform such that the main parachute may be deployed by the drag force generated by the extraction parachute via the extraction assembly pulling on the main parachute deployment line.

The method may comprise, when the main parachute deployment line is uncoupled from the extraction parachute, jettisoning the extraction parachute by releasing the extraction parachute from the platform.

The method may comprise transmitting the drag force along a primary load path to the platform such that no other load path exists along which to transmit the drag force from the extraction parachute to the platform.

The present invention also provides, according to a variation of the third aspect, a method of parachuting, with the use of a main parachute, a platform carrying cargo from an aircraft in flight comprising the steps of an extraction parachute dragging the platform from the aircraft, while a coupling between the extraction parachute and the main parachute remains open, once certain criteria are met (for example, the platform has moved beyond a certain position in the aircraft and/or has exceeded a threshold speed) closing the coupling between the extraction parachute and the main parachute, as a consequence of closing the coupling the extraction parachute causing the main parachute to deploy. The certain criteria may be met by means of a mechanical device being activated by the movement of the platform, for example by means of a drop arm, or other lever, button or the like being moved/actuated.

The present invention also provides, according to a variation of the third aspect, a method of airdropping cargo from an aircraft to the ground using an aerial delivery system as described herein. The method comprising the steps of: using the extraction parachute to exert the drag force on the platform, wherein initially the coupling arrangement is in the open configuration and the platform is in an initial position relative to the aircraft. The coupling arrangement is (e.g. automatically) switched to the closed configuration to couple the main parachute deployment line to the extraction parachute when the platform has moved under the action of the drag force from the initial position to a first position relative to the aircraft. The extraction parachute is (e.g. automatically) uncoupled from the platform when the platform has moved under the action of the drag force from the first position to a second position relative to the aircraft.

The present invention provides, according to a fourth aspect, an extraction parachute release assembly. The extraction parachute release assembly may be for triggering release of an extraction parachute from a platform during an extraction of the platform from an aircraft. The extraction parachute release assembly may comprise a trigger assembly and a first trigger release assembly. The trigger assembly may comprise a trigger spring, a releasable member and a trigger. The trigger assembly may comprise an armed configuration in which the releasable member is held in an armed position against a bias force of the trigger spring. The first trigger release assembly may be arranged to operate the trigger, wherein operation of the trigger releases the releasable member such that the releasable member can move under the bias force of the trigger spring to a discharged position. Movement of the releasable member from the armed position to the discharged position may generate a release force for, in use, causing release of the extraction parachute from the platform.

The extraction parachute release assembly may comprise any of the features set out in relation to the first to third aspects.

The present invention provides, according to a fifth aspect, an extraction parachute release assembly. The extraction parachute release assembly may be for triggering release of an extraction parachute from a platform during an extraction of the platform from an aircraft. The extraction parachute release assembly may comprise a first release assembly for triggering release of the extraction parachute (e.g. automatically) when the platform reaches a predetermined position relative to the aircraft during the extraction of the platform. The first release assembly may be configured to trigger release of the extraction parachute in response to rotation of a drop arm. The extraction parachute release assembly may comprise a second release assembly for triggering release of the extraction parachute in response to receipt of a user initiated release signal. The user initiated release signal may be a user initiated release force, for example received via a cable. Both the first release assembly and second release assembly may trigger release by transmitting a release force (from the extraction parachute release assembly) acting through a force transmitting cable. The cable may be the same cable serving both the first release assembly and second release assembly. Both the first release assembly and second release assembly may selectively trigger the same trigger assembly which generates the transmitted release force.

The extraction parachute release assembly may comprise any of the features set out in relation to the first to fourth aspects.

The first and second release assemblies may be the first and second trigger release assemblies described above. The first and second release assemblies may be provided in the same housing and/or attached to the same body.

The extraction parachute release assembly may be configured such that at least part of the second release assembly detaches and remains in the aircraft during extraction of the platform. The second release assembly may comprise a force transfer latch through which the user initiated release force is transferred. The force transfer latch may comprise any of the features described in relation to the first aspect.

The extraction parachute release assembly may comprise a (further) latch mechanism in communication with a lanyard, wherein when the lanyard is pulled taught, the latch mechanism disengages and uncouples said at least part of the second release assembly from a remaining part of the extraction parachute release assembly. The (further) latch mechanism may comprise any of the features described in relation to the first aspect.

The present invention provides, according to a sixth aspect, a jettison assembly for effecting a (e.g. user initiated)

jettison of an extraction parachute from a platform during an extraction of the platform from an aircraft. The jettison assembly may comprise a jettison handle for operation by a user. The jettison assembly may comprise a connecting block for connecting to a force transmitting cable. The jettison handle may be in operative engagement with the connecting block, such that operation of the jettison handle moves the connecting block and applies a release force to the force transmitting cable. The jettison assembly may comprise any of the features described in relation to the first aspect.

The present invention provides, according to a seventh aspect, an aerial delivery system for carrying cargo from an aircraft to ground, the aerial delivery system comprising one or more of: an extraction assembly according to the second aspect, an extraction parachute release assembly according to the fourth or fifth aspect, and/or a jettison assembly according to the sixth aspect.

The present invention provides, according to an eight aspect, an aircraft comprising the aerial delivery system according to the first or seventh aspect, or the extraction assembly according to the second aspect, or the extraction parachute release assembly according to the fourth or fifth aspect, or the jettison assembly according to the sixth aspect.

It will of course be appreciated that features described in relation to one aspect of the present invention may be incorporated into other aspects of the present invention. For example, the method of the third aspect of the invention may incorporate any of the features described with reference to the first, second and fourth to seventh aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
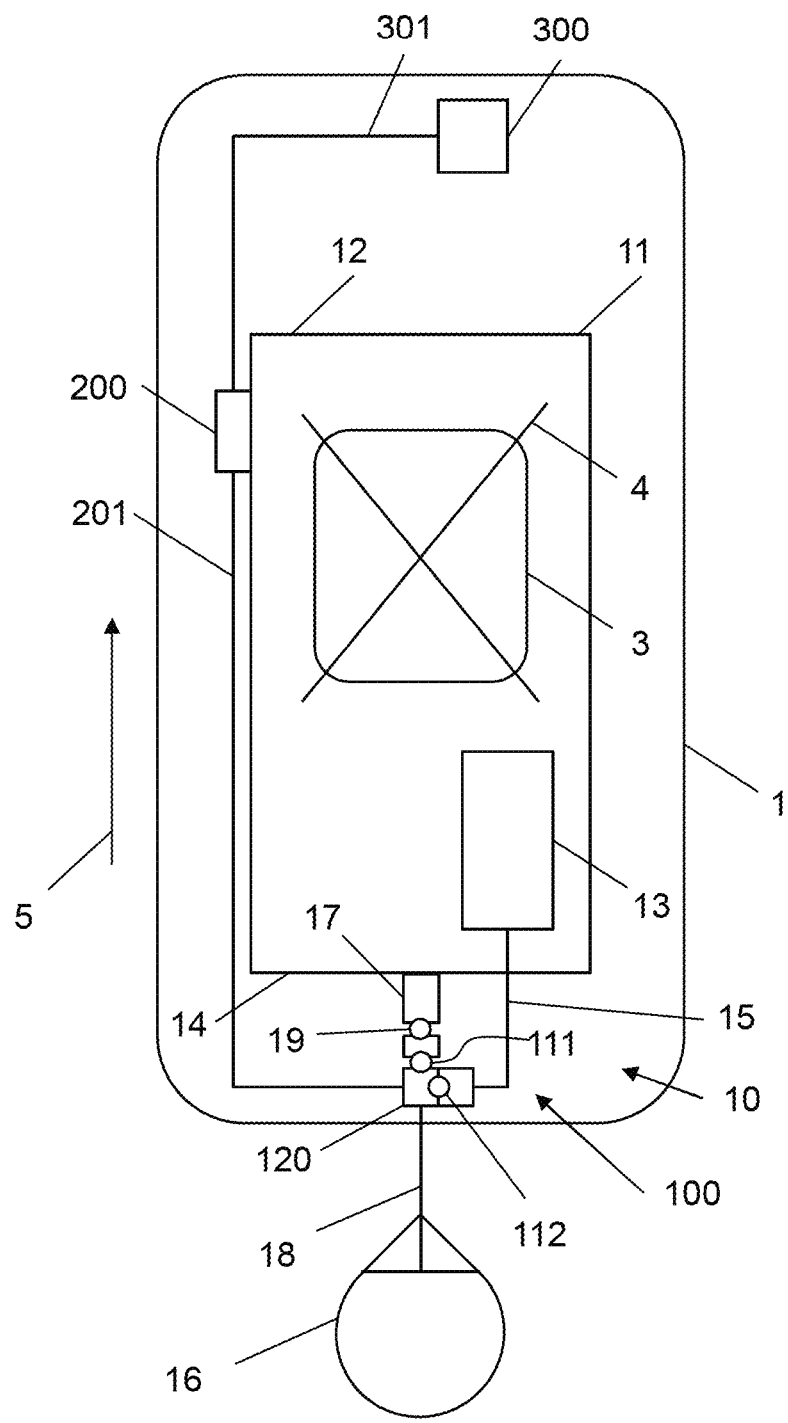
FIG. 1 is a schematic diagram of an aerial delivery system according to a first embodiment.

FIG. 1 shows a schematic diagram of an aerial delivery system 10 according to a first embodiment. The aerial delivery system 10 is shown operable with an aircraft 1 that is travelling in a flight direction 5. The aerial delivery system 10 comprises a platform 11 carrying cargo 3. The cargo 3 is secured fast to the platform 11 by webbing 4, for example. An example of cargo 3 is a military vehicle to be carried to ground by an air drop from the aircraft 1 as facilitated by the aerial delivery system 10. The platform 11 comprise a fore end 12, an aft end 14, and a mounting bracket 17.

The aerial delivery system 10 comprises an extraction assembly 100 pivotally coupled to the platform 11 via the mounting bracket 17 by the use of a pivotal coupling 19. The pivotal coupling 19 comprise two degrees of freedom, wherein a direction of each of the two degrees of freedom is perpendicular to each other.

The aerial delivery system 10 comprises an extraction parachute 16, an extraction line 18, a main parachute 13 and a main parachute deployment line 15 (sometimes referred to as a riser to the main parachute 13).

The extraction assembly 100 is arranged with a first releasable coupling 111 and a second releasable coupling 112. The extraction assembly 100 comprises a coupling arrangement 120. The coupling arrangement 120 comprises a first coupling portion 121 and a second coupling portion 122 (not labelled in FIG. 1). The first coupling portion 121 and second coupling portion 122 are connected via the second releasable coupling 112. The first coupling portion 121 is connected to the extraction line 18. The second coupling portion 122 is connected to the main parachute deployment line 15. The coupling arrangement 120 is switchable from an open configuration in which the main parachute deployment line 15 is uncoupled from the extraction parachute 16 (the second releasable coupling 112 is opened), and a closed configuration in which the main parachute deployment line 15 is coupled to the extraction parachute 16 (the second releasable coupling 112 is closed).

The aerial delivery system 10 comprises an extraction parachute release assembly 200 and a jettison release assembly 300. The extraction parachute release assembly 200 is coupled to the extraction assembly 100 by an extraction parachute release assembly line 201. The jettison release assembly 300 is coupled to the extraction parachute release assembly 200 by a jettison release assembly line 301.

In normal operation of the aerial delivery system 10, a drag force event will occur when the aircraft 1 is airborne and the extraction parachute 16 is deployed. Once deployed, the extraction parachute 16 generates a drag force on the aircraft 1 and the drag force is exerted on the platform 11 via the extraction assembly 100 while the extraction parachute 16 remains coupled to the platform 11 by the extraction assembly 100. The drag force exerted on the platform 11 is capable of moving the platform 11 along the aircraft 1 towards an open exit of the aircraft 1. In the example shown, the platform 11 moves with respect to the aircraft 1 in a direction opposite to the flight direction 5. During the drag force event, and the consequent movement of the platform 11 by the drag force, the coupling arrangement 120 is initially in the open configuration, meaning that the main parachute deployment line 15 is uncoupled from the extraction parachute 16. The main parachute 13 is thus disconnected from a load path from the extraction parachute 16 and thus is unable open prematurely whilst the platform 11 is in the aircraft 1. In the open configuration, the aerial delivery system 10 is thus in failsafe configuration. Switching the coupling arrangement 120 to the closed configuration connects the main parachute 13 to the load path from the extraction parachute 16. Therefore, at the appropriate moment, the extraction parachute 16 can become disconnected from the platform 11 by opening the first releasable coupling 111 according to operation of the extraction parachute release assembly 200. The extraction parachute 16 can then deploy the main parachute 13.

In an emergency situation, while the coupling arrangement 120 is in the open configuration, the extraction parachute 16 can be jettisoned from the platform 11 by opening the first releasable coupling 111 according to operation of the jettison release assembly 300 (which may be manually operated by a crew member, such as a loadmaster). When jettisoning the extraction parachute 16 by the jettison release assembly 300 with the coupling arrangement 120 in the open configuration, the main parachute 13 will not deploy and the risk of interference by the main parachute 13 on the flight of the aircraft 1 is mitigated. It has thus been found that providing a coupling arrangement 120 that is initially in the open configuration can help to improve safety for the aircraft 1 and crew when in-flight.

Under normal operation (and during the drag force event), the platform 11 continues to move to the open exit of the aircraft 1. At a first predetermined moment, corresponding to a first predetermined relative position of the platform 11 and aircraft 1, the extraction assembly 100 determines that the coupling arrangement 120 should be switched from the open configuration and to the closed configuration (the second releasable coupling 112 is closed). Switching the coupling arrangement 120 to the closed configuration couples the main parachute deployment line 15 to the extraction parachute 16. Until the moment that the coupling arrangement 120 and extraction parachute 16 are released, the load path of the drag force remains from the extraction parachute 16 to the platform 11 without the main parachute deployment line 15 taking any tension. At a second predetermined moment, corresponding to a second predetermined relative position of the platform 11 and aircraft 1, the extraction parachute release assembly 200 determines that the coupling arrangement 120 can be released from the extraction assembly 100 (by opening the first releasable coupling 111) by operation of the extraction parachute release assembly 200 via the extraction parachute release assembly line 201. This disconnects the load path to the platform 11, such that, with the coupling arrangement 120 in the closed configuration, the drag force by the extraction parachute 16 pulls on the main parachute deployment line 15 to deploy the main parachute 13.

In the example shown, the first predetermined moment corresponds to approximately when the aft end 14 of the platform 11 has left the aircraft 1, and the second predetermined moment corresponds to approximately when the fore end 12 of the platform 11 has left the aircraft 1. As can be appreciated, in reality, the normal operation of the aerial delivery system 10 as described above occurs in a matter of seconds once the platform 11 starts to move from an initial standing position in the aircraft 1 and towards the open exit. Specific detail of how the aerial delivery system 10 operates is shown in FIGS. 2 to 23 and described below.

Figure 2:
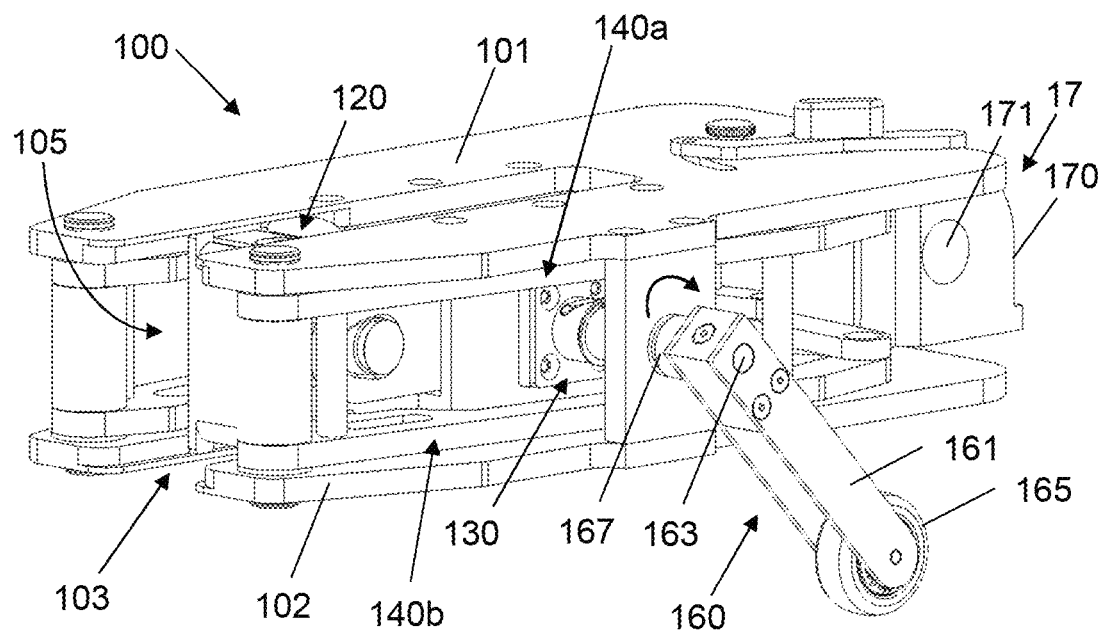
FIG. 2 is a perspective view of an extraction assembly according to the first embodiment.

FIG. 2 is a perspective view of the extraction assembly 100 in detail. The extraction assembly 100 comprises a main body 103 sandwiched between an upper plate 101 and a lower plate 102. The extraction assembly 100 comprises an exit 105 through which part of or all of the coupling arrangement 120 can leave the extraction assembly 100, for example under the drag force exerted by the extraction parachute 16 when coupled to at least part of the coupling arrangement 120. However, in the view shown in FIG. 2, the coupling arrangement 120 is held captive by the extraction assembly 100.

A mounting bracket main body 170 is shown in FIG. 2 that is pivotally mounted to the main body 103 of the extraction assembly 100 by a first pivotal coupling 171. The first pivotal coupling 171 provides a first degree of freedom and enables the extraction assembly 100 to move relative to the platform 11 in a first direction corresponding to a vertical direction.

The extraction assembly 100 comprises a coupling device 130 that is configured to switch the coupling arrangement 120 from the open configuration to the closed configuration. The coupling device 130 is shown in more detail in FIG. 3 and is discussed further below. The extraction assembly 100 also comprises a first drop arm 160, sometimes referred to as a coupling device lever. The first drop arm 160 actuates the coupling device 130. The first drop arm 160 comprises a lever arm 161, a lever arm pivot 163, a rotatable wheel 165, and a bias member 167.

The first drop arm 160 is moveable between a loaded configuration, shown in FIG. 2 and an unloaded configuration. In the loaded configuration, a bias force from the bias member 167 urges the lever arm 161 to rotate about the lever arm pivot 163. When looking at FIG. 2, that rotation will be in a clockwise direction as shown by the curved arrow above the bias member 167.

Prior to the platform 11 reaching the first predetermined position relative to the aircraft 1, contact between the rotatable wheel 165 and a floor of a cargo bay of the aircraft 1 (or whatever structure underlies the platform) prevents further rotation of the lever arm 161.

As the platform 11 moves towards the rear of the aircraft 1, the rotatable wheel 165 runs along the floor of the cargo bay (or structure underlying the platform). When the platform reaches the first predetermined position (at the first predetermined moment), a distance between the floor of the cargo bay (or structure underlying the platform) and the main body 103 of the extraction assembly 100 increases and the lever arm 161 rotates about the lever arm pivot 163 under the bias force. The drop arm 160 thus moves to the unloaded configuration.

When moving to the unloaded configuration, the first drop arm 160 actuates the coupling device 130 and causes the coupling arrangement 120 to switch from the open configuration to the closed configuration. The bias force acting on the first drop arm 160 may cause the lever arm 161 to pivot beyond a predetermined angle, for example beyond 90 degrees, at which point the coupling arrangement 120 adopts the closed configuration.

Figure 4:
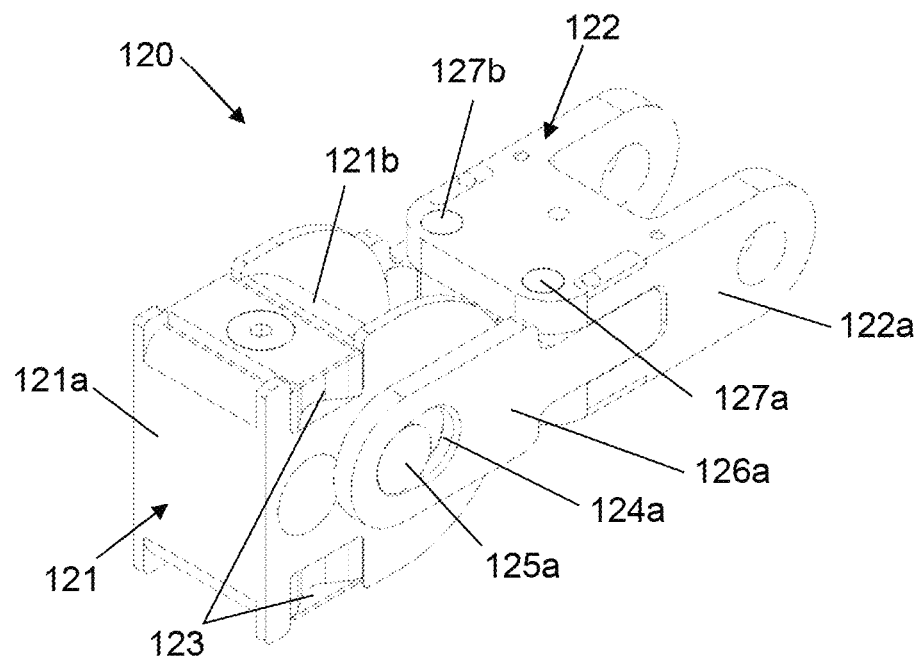
FIG. 4 is a perspective view of a coupling arrangement.

FIG. 4 shows a perspective view of the coupling arrangement 120. The coupling arrangement 120 comprises a first coupling portion 121, sometimes referred to as a bobbin, and a second coupling portion 122 reversibly coupled to the first coupling portion 121.

The first coupling portion 121 comprises a main body 121a, a curved surface 121b around which the extraction line 18 can be wound, a pair of coupling lugs 125a,b protruding from the main body 121a in opposing directions (only one coupling lug 125a is visible in FIG. 4; both coupling lugs 125a,b are visible in FIGS. 5 and 7, for example), and four notches 123 (four female members) in the main body 121a (only two are visible in FIG. 4).

Figure 5:
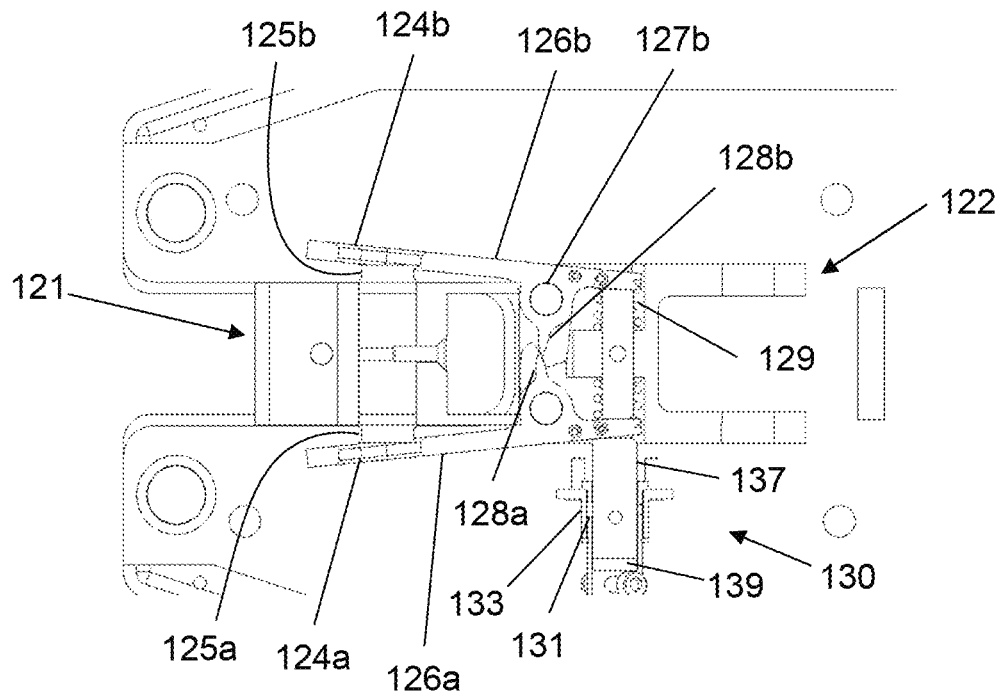
FIG. 5 is a top plan view of the extraction assembly according to the first embodiment showing detail of the coupling arrangement.

The second coupling portion 122 comprises a main parachute bracket 122a (in use, coupled to the main parachute deployment line 15), a pair of legs 126a,b (only one leg 126a is visible in FIG. 4; both legs 126a,b are visible in FIGS. 5 and 7, for example), and a pair of leg pivots 127a,b. Each leg 126a,b comprises an oval hole 124a,b at a first end. As shown in FIG. 5, the second coupling portion 122 further comprises a bias arrangement comprising a biasing member in the form of a spring 129. The spring 129 is a compression spring which pushes against a second end of each leg 126a,b. The first and second ends of each leg 126a,b are on different sides of the respective leg pivot 127a,b. The spring 129 thereby biases the first ends of the legs 126a,b towards each other, and towards the respective coupling lug 125a,b.

Each leg 126a,b also comprises a set of cam lobes 128a,b. The cam lobes 128a,b mesh with each other (like gear teeth) such that the two legs 126a,b move interdependently about the respective leg pivots 127a,b. In embodiments, there may be a single cam lobe on each leg.

Each oval hole 124a,b may be referred to as an egg-shaped hole such that a smaller end of the oval hole 124a,b comprises an arcuate surface with a radius that is smaller than a radius of an opposing arcuate surface at an opposing larger end.

In FIG. 4, the coupling arrangement 120 is shown in the closed configuration, whereas in FIG. 5, the coupling arrangement 120 is shown in the open configuration. The coupling arrangement 120 is switchable to the closed configuration by the coupling device 130 that is shown in detail in FIGS. 3 and 5.

Figure 3:
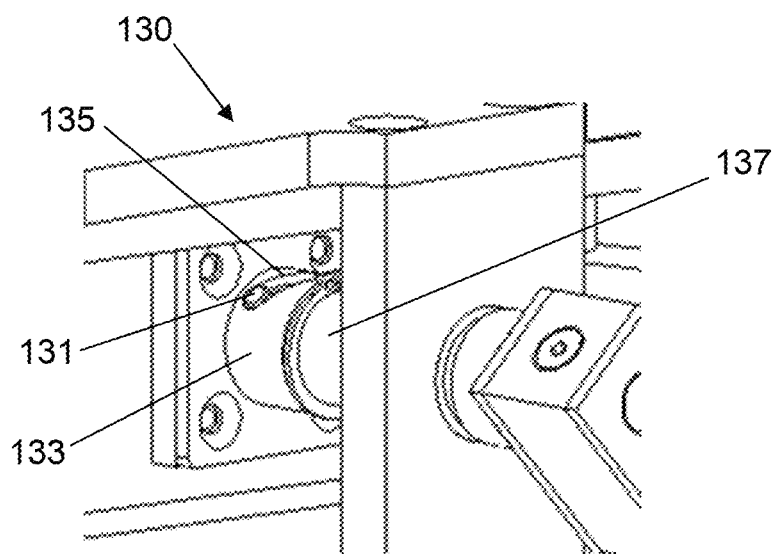
FIG. 3 is an enlargement of the perspective view of FIG. 2 showing detail of the extraction assembly according to the first embodiment.

The coupling device 130, detail of which is enlarged in FIG. 3, comprises a pushrod 137 and a cam mechanism. The cam mechanism comprises a cam housing 133 comprising a slot 135, and a cam follower 131 slidable along the slot 135 in the cam housing 133. The pushrod 137 is moveable within the cam housing 133. The pushrod 137 and cam follower 131 are rotatably coupled to the lever arm 161 of the first drop arm 160 such that the pushrod 137, cam follower 131 and lever arm 161 rotate together.

In the open configuration of the coupling arrangement 120, the push rod 137 pushes the second end of leg 126a inwards, against the bias of the spring 129. The first end of leg 126a is held outwards, with the lug 125a not retained in the oval hole 124a. The engagement of the cam lobes 128a,b means that the other leg 126b is held in a corresponding position, with the second end of leg 126b pushed inwards against the spring 129, and the first end of leg 126b held outwards, with the lug 125b not retained in the oval hole 124b.

On rotation of the first drop arm 160 from the loaded configuration to the unloaded configuration, the cam follower 131 slides along and is guided by the slot 135 and the pushrod 137 moves into a void 139, as shown in FIG. 5. This allows the leg 126a, and accordingly also leg 126b, to be moved by the bias of the spring 129. The rotational and translational movement of the pushrod 137 thereby switches the coupling arrangement 120 from the open configuration to the closed configuration under the bias of the spring 129.

The bias of the spring 129 urges the second ends of the legs 126a,b apart, and first ends of the legs 126a,b inwards and causes the first ends of the legs 126a,b to pivot toward each other about their respective leg pivot 127a,b. The cam lobes 128a,b engage and encourage the pivoting movement of the legs 126a,b. Pivoting the legs 126a,b causes the pair of coupling lugs 125a,b to enter the respective oval hole 124a,b. The legs 126a,b thereby form a clasp which retains the first coupling portion 121 when the coupling arrangement 120 is in the closed configuration. Before the first coupling portion 121 is released by the extraction assembly 100, the coupling lugs 125a,b are in the larger end of the oval holes 124a,b once the legs 126a,b have pivoted towards each other.

Each of the coupling lugs 125a,b comprise a lip with a radius greater than the radius of the smaller end of the oval hole 124a,b. This enables the legs 126a,b to be held fast to the coupling lugs 125a,b when the coupling lugs 125a,b move to the smaller end of the oval hole 124a,b (as shown in FIG. 4) under the drag force when the first coupling portion 121 is released by the extraction assembly 100.

Figure 6:
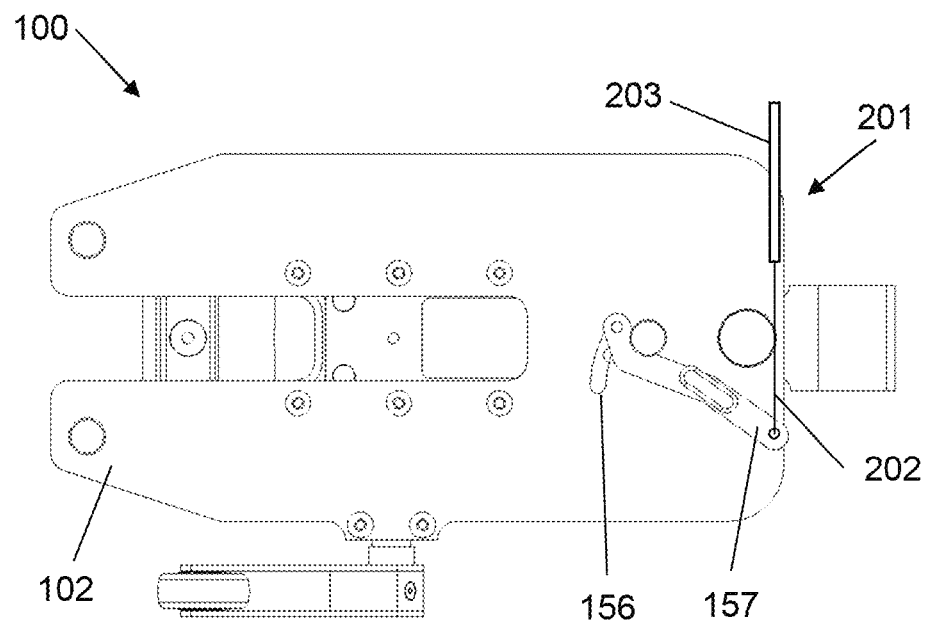
FIG. 6 is a bottom plan view the extraction assembly.
Figure 7:
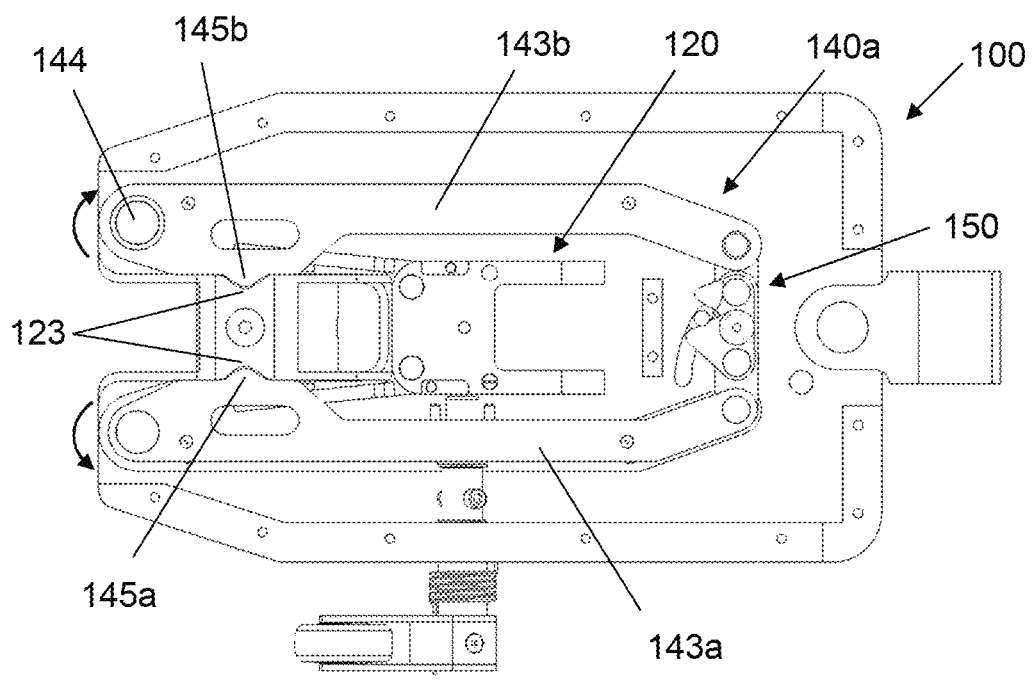
FIG. 7 is a top plan view of the extraction assembly according to the first embodiment when the coupling arrangement is in an open configuration and an extraction parachute release device is in a closed configuration.
Figure 8:
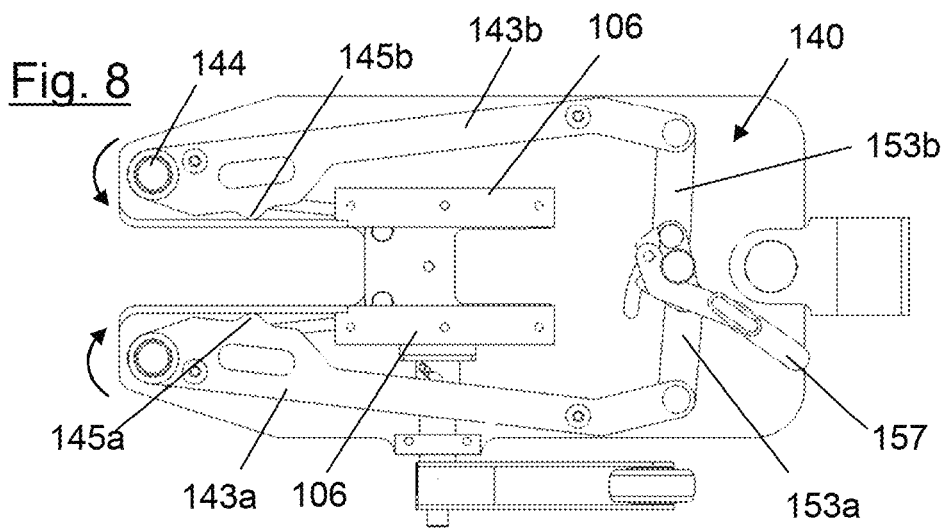
FIG. 8 is a top plan view of the extraction assembly according to the first embodiment when the coupling arrangement is in the open configuration and extraction parachute release device is in an open configuration.

FIGS. 6 to 13 show the extraction assembly 100 in various arrangements. Referring first to FIGS. 6 to 8, the extraction assembly 100 comprises an extraction parachute release device 140. The extraction parachute release device 140 provides the first releasable coupling 111 shown schematically in FIG. 1. The extraction parachute release device 140 is a mechanical mechanism comprising an upper calliper 140a and a lower calliper 140b (labelled in FIG. 2) that are each connected to a locking device comprising a series of interconnected pivotal lever arms 150. The upper calliper 140a is shown in FIGS. 7 and 8. Each calliper comprises a pair of jaws 143, pivotal about a respective jaw pivot 144. Each of the jaws 143 comprises a protuberance (male member) in the form of a jaw lug 145a,b. A first jaw lug 145a on a first jaw 143a faces a second jaw lug 145b on a corresponding second jaw 143b. The jaw lugs 145a,b are arranged to engage with the notches 123 (female members) in the main body 121a of the first coupling portion 121.

The extraction parachute release device 140 is switchable between a closed configuration and an open configuration. When in the closed configuration, shown in FIG. 7, the jaws 143 hold the first coupling portion 121 of the coupling arrangement 120 captive in the main body 103 of the extraction assembly 100 by engaging the jaw lugs 145a,b with the corresponding notches 123 within the main body 121a of the first coupling portion 121. During a drag force event, the drag force generated by the extraction parachute 16 can thereby be transferred directly to the platform 10 via the extraction assembly 100.

When in the open configuration, shown in FIGS. 8 to 13, the jaws 143 are pivoted away from each other and the jaw lugs 145a,b are disengaged from the corresponding notches 123 in the first coupling portion 121. The first coupling portion 121 is thereby released and free to pass through the exit 105 in the main body 103 of the extraction assembly 100.

FIGS. 14a-f show the series of interconnected pivotal lever arms 150 in more detail. The series of interconnected pivotal lever arms 150 controls the movement of the pairs of jaws 143. The series of interconnected pivotal lever arms 150 comprises a set of central lever arms 151 (most easily seen in FIG. 14f) which are rotatably mounted about a pivot 152. The set of central lever arms 151 comprises four lever arms in a vertical stack. The four lever arms rotate together about the pivot 152 in a fixed relation to each other.

The series of interconnected pivotal lever arms 150 further comprises a set of link arms 153a,b. A first link arm 153a is pivotally attached at a first end to the first jaw 143a, and is pivotally attached at a second end to two middle arms 151b,c of the set of central lever arms 151. Two second link arms 153b are pivotally attached at a first end to the second jaw 143b, and are pivotally attached at a second end to the set of central lever arms 151. An upper second link arm 153b is attached at the second end to an upper lever arm 151a and an upper middle lever arm 151b of the set of central lever arms 151. A lower second link arm 153b is attached at the second end to a lower lever arm 151d and a lower middle lever arm 151c of the set of central lever arms 151.

The series of interconnected pivotal lever arms 150 is arranged such that the set of central lever arms 151 can (in the absence of any obstruction) rotate freely about the pivot 152. By rotating the set of central lever arms 151, the link arms 153a,b and the jaws 143 are drawn in and pushed out in a cycle. The set of central lever arms 151 thus act as a crank. The four lever arms of the set of central lever arms 151 are connected to each other via their pivot points and they are spaced such that the link arms 153a,b can pass between them.

The lever arms of the set of central lever arms 151 each comprise a laterally extending projection 154. The projections each extend in the same direction. The locking device further comprises a locking member. Adjacent the series of interconnected pivotal lever arms 150 there is provided the locking member, which is in the form of a pin 155 which is slidable in arcuate slots 156 formed in the upper and lower plates 101, 102 of the extraction assembly 100.

Figure 14A:
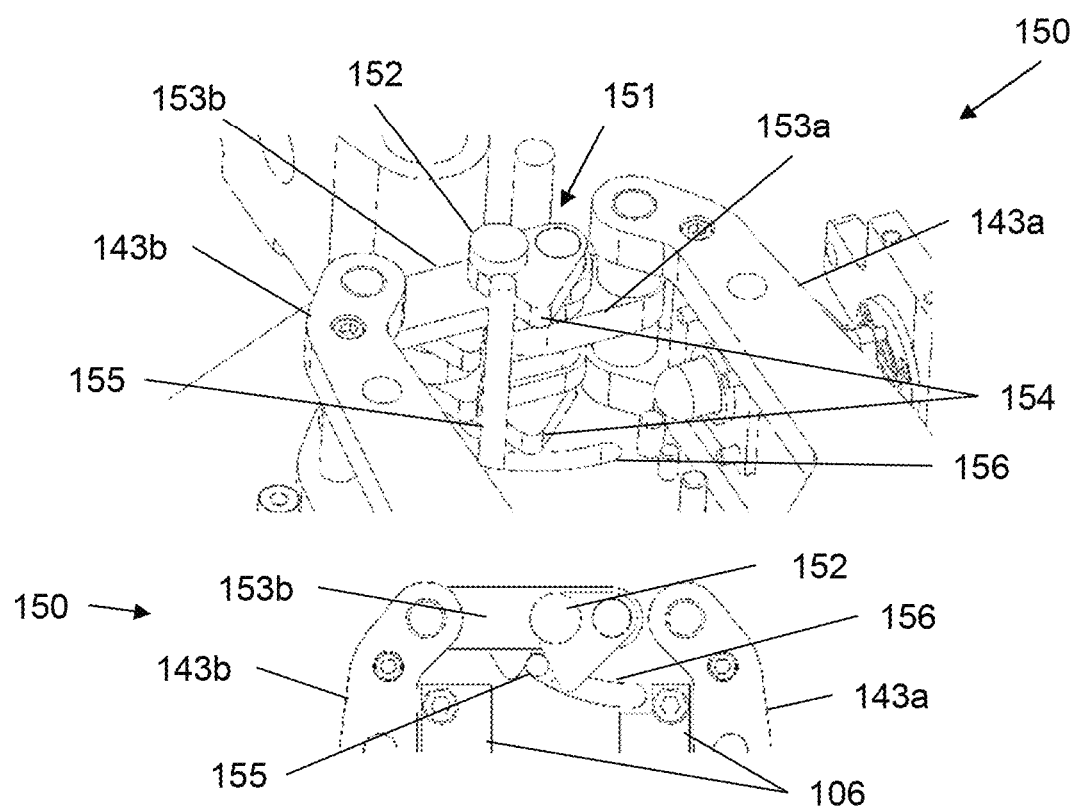
FIGS. 14a-f are a series of perspective and plan views of an extraction parachute release device of the extraction assembly according to the second embodiment, the views being taken at different stages between a closed and an open configuration.
Figure 14A:
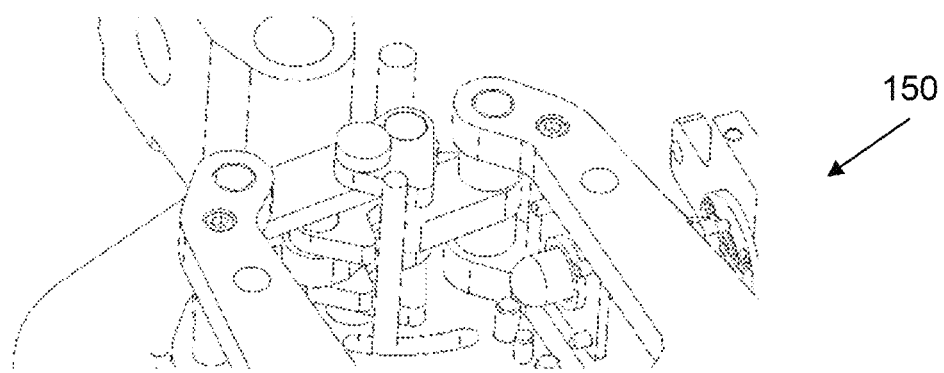
Figure 14B:
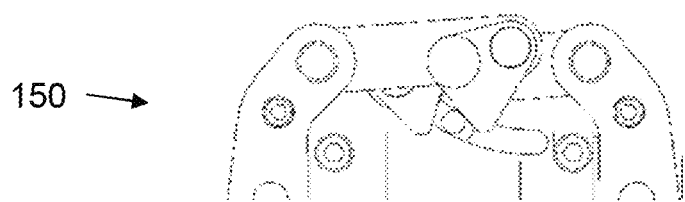
Figure 14C:
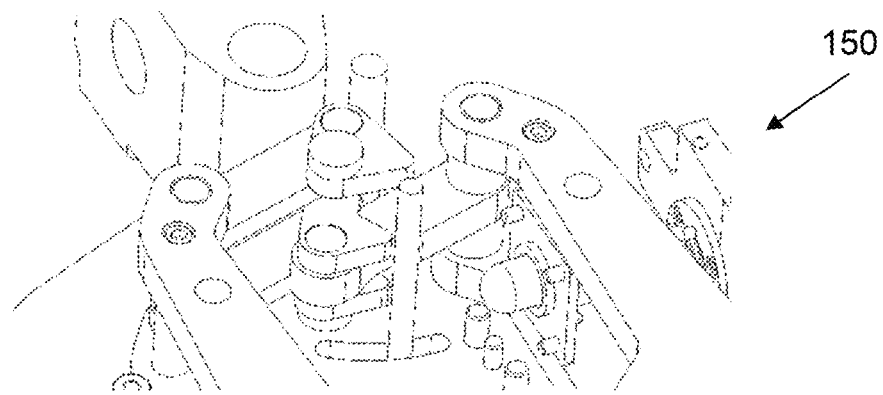
Figure 14C:
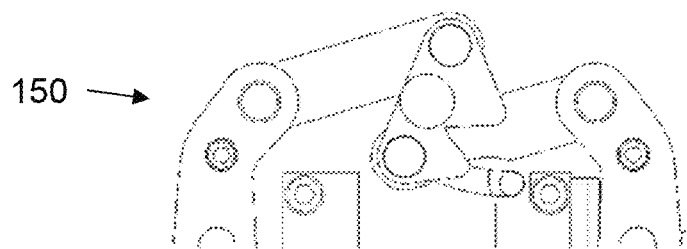
Figure 14D:
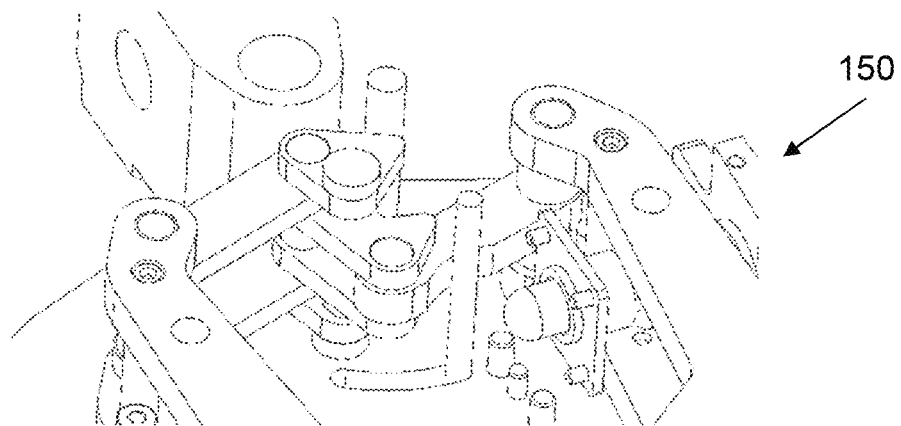
Figure 14D:
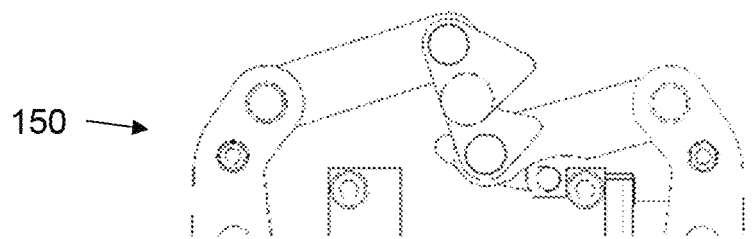
Figure 14E:
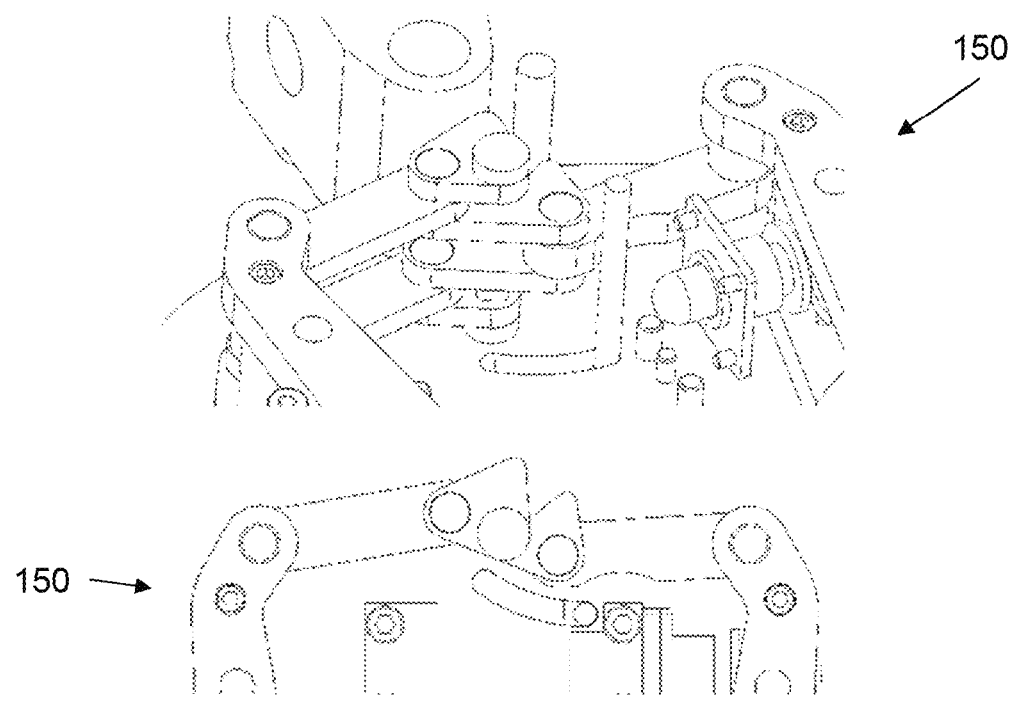
Figure 14F:
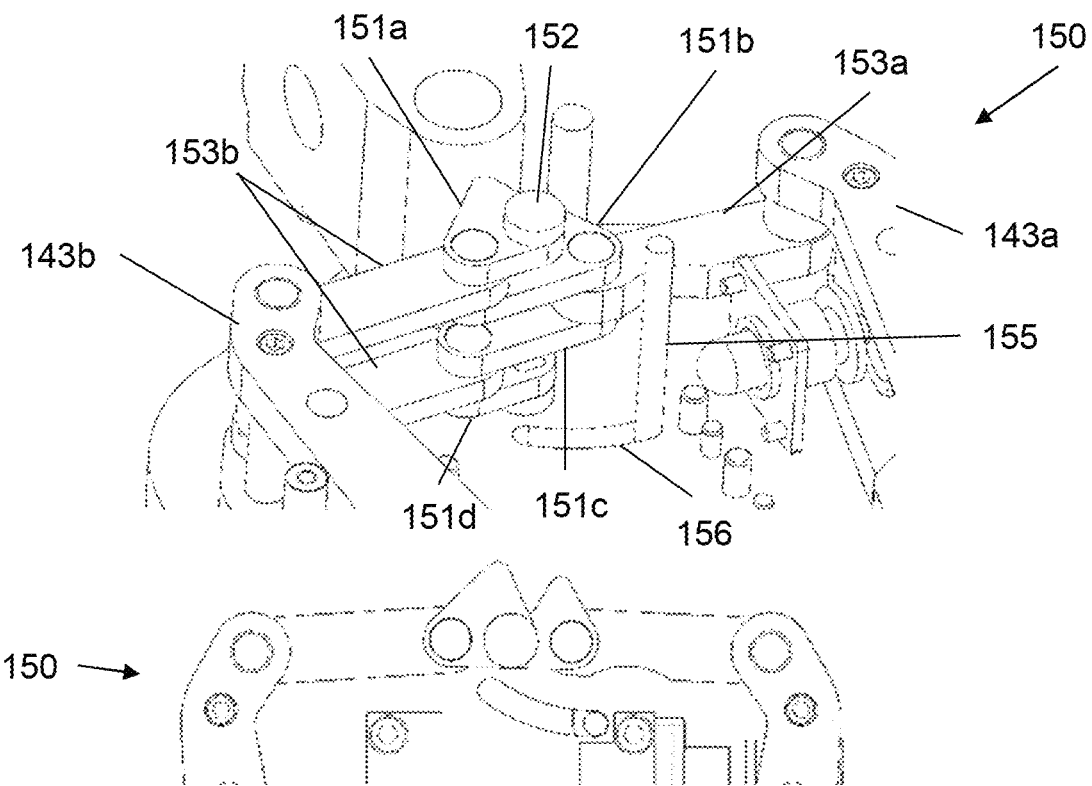

As shown in FIG. 14a, in the closed configuration of the extraction parachute release device 140, the pin 155 is provided in a first position at a first end of the arcuate slots 156. The pin 155 holds the series of interconnected pivotal lever arms 150 in an over-centre position. The laterally extending projections 154 of the upper lever arm 151a and lower lever arm 151d of the set of central lever arms 151 engage the pin 151 and hold it against the first end of the slot 156. The series of interconnected pivotal lever arms 150 are in an over-centre position in the sense that any force urging the jaws 143 apart acts, via the link arms 153a,b, on the side of the pivot 152 where the pin 155 is located. As the pin 155 is trapped against the first end of the slot 156, the set of central lever arms 151 cannot rotate around the pivot 152, and the jaws 143 are held closed. The locking device is thus in a locked configuration.

In the closed configuration, an inner surface of each jaw 143 engages with a rectangular stop 106 (see FIG. 8). Each stop 106 is provided with a plurality of biased ball detents (not shown) which push against the jaws 143 and urge them outwards away from their closed position and towards their open position. This slight outward pressure helps, in the absence of a drag force on the extractor parachute and coupling arrangement 120, to keep the series of interconnected pivotal lever arms 150 in the over-centre (locked) position.

The pin 155 is mounted to a pair of activation arms 157 (see FIG. 8), there being an upper activation arm 157 above the upper plate 101, and a lower activation arm 157 below the lower plate 102. The activation arms 157 are pivotally mounted such that when the activation arms 157 pivot, the pin 155 slides within the arcuate slot 156 towards a second position. As shown schematically in FIG. 6, the upper activation arm 157 is attachable at an end opposite the pin 155 to an inner force transmitting line 202 of the extraction parachute release assembly line 201. An outer sleeve 203 of the extraction parachute release assembly line 201 is held in a fixed position relative to the main body 103 of the extraction assembly 100.

To arrange the extraction parachute release device 140 in the open configuration, the upper activation arm 157 is pulled by the inner force transmitting line 202. The series of interconnected pivotal lever arms 150 is arranged such that when the inner force transmitting line 202 is pulled, the pin 155 is moved by the activation arms 157 towards a second end of the arcuate slot 156. As the pin 155 moves, the pin 155 pushes against the laterally extending projections 154 of the upper lever arm 151a and lower lever arm 151d and causes the set of central lever arms 151 to rotate about the pivot 152 (in the anti-clockwise direction as shown in FIG. 14a-f). The series of interconnected pivotal lever arms 150 is thereby moved away from the over-centre position (see FIG. 14b).

Once away from the over-centre position, any force urging the jaws 143 apart acts, via the link arms 153a,b, on the side of the pivot 152 opposite to where the pin 155 is located. The set of central lever arms 151 can then rotate around the pivot 152 and the jaws 143 can open (see FIGS. 14c-f). The slots 156 are arranged such that the pin 155 can be moved fully out of the way of the set of central lever arms 151 and the link arms 153a,b such that the set of central lever arms 151 can freely spin about their pivot 152.

As the jaws 143 open, the jaw lugs 145a,b disengage the corresponding notches 123 and the first coupling portion 121 of the coupling arrangement 120 is released. When the first coupling portion 121 is under the drag force of the extraction parachute 16, the first coupling portion 121 exits the extraction assembly 100 through the exit 105 of the extraction assembly 100, as shown by FIGS. 9 and 10.

Figure 9:
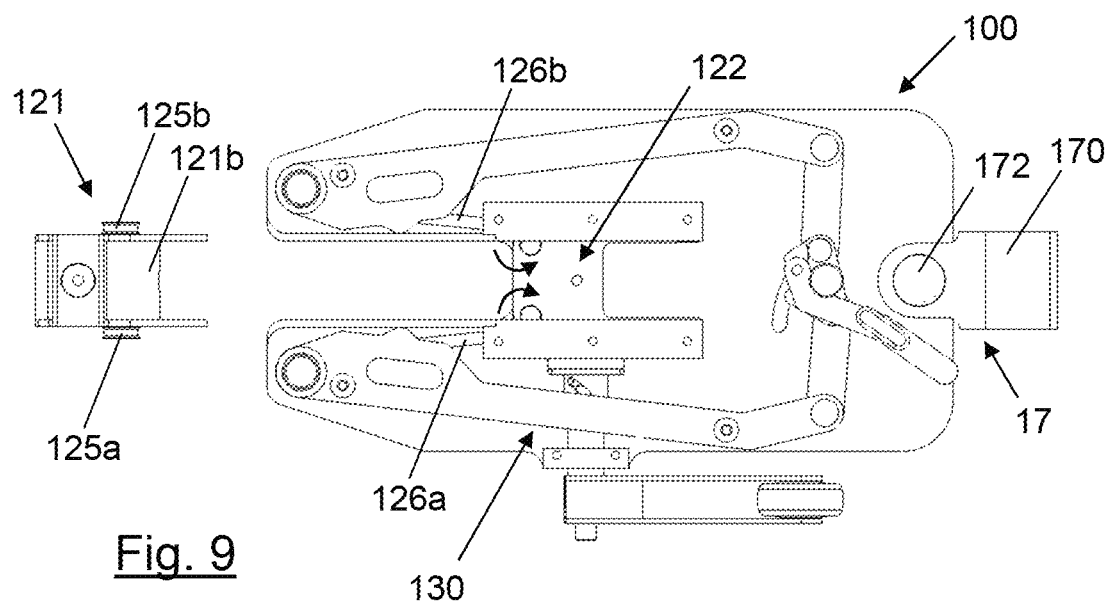
FIG. 9 is a top plan view of the extraction assembly shown in FIG. 8 with a first coupling portion of the coupling arrangement released from the coupling arrangement.
Figure 10:
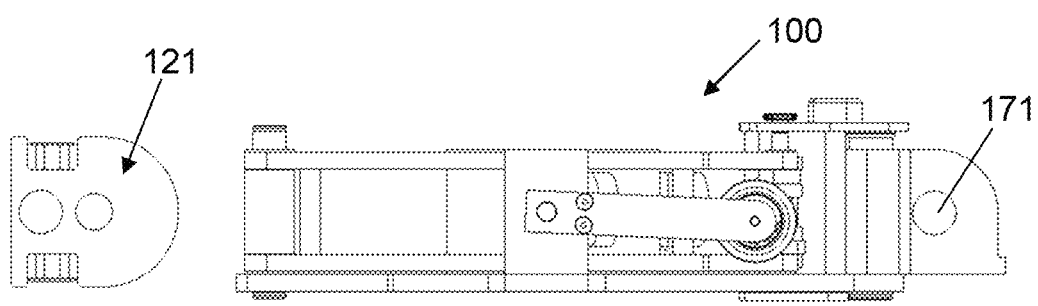
FIG. 10 is a side view of the extraction assembly and first coupling portion shown in FIG. 9.

FIGS. 8 to 10 show the extraction parachute release device 140 in the open configuration whilst the coupling arrangement 120 is also in the open configuration. As a result, only the first coupling portion 121 is released. Release of the first coupling portion 121 without coupling to the second coupling portion 122 is representative of the emergency situation as described above.

Figure 11:
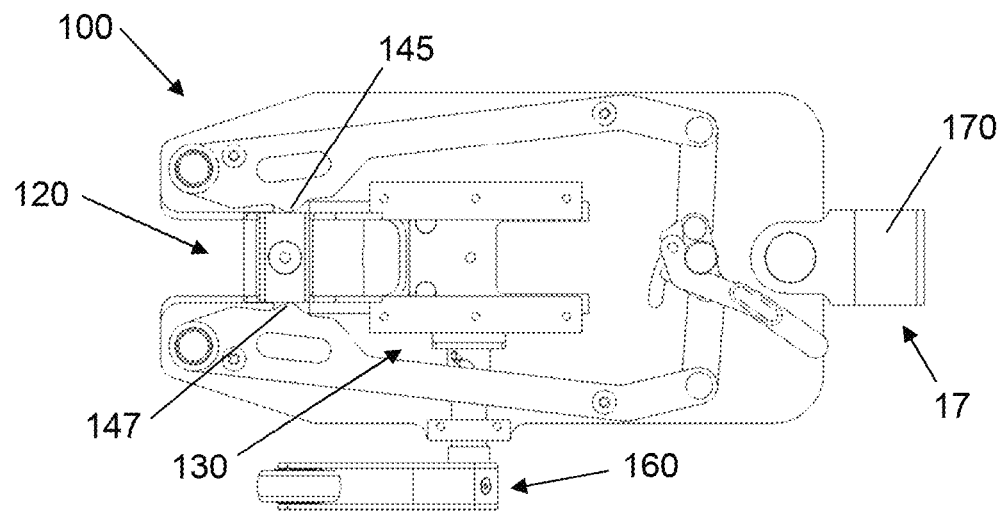
FIG. 11 is a top plan view of the extraction assembly according to the first embodiment when the coupling arrangement is in a closed configuration before release of the coupling arrangement.
Figure 12:
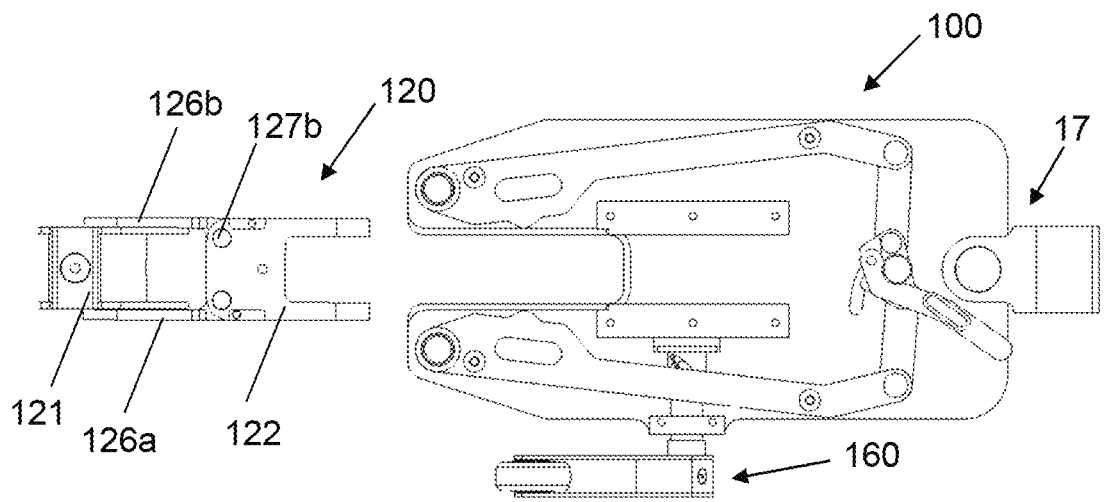
FIG. 12 is a top plan view of the extraction assembly according to the second embodiment when the coupling arrangement is released.
Figure 13:
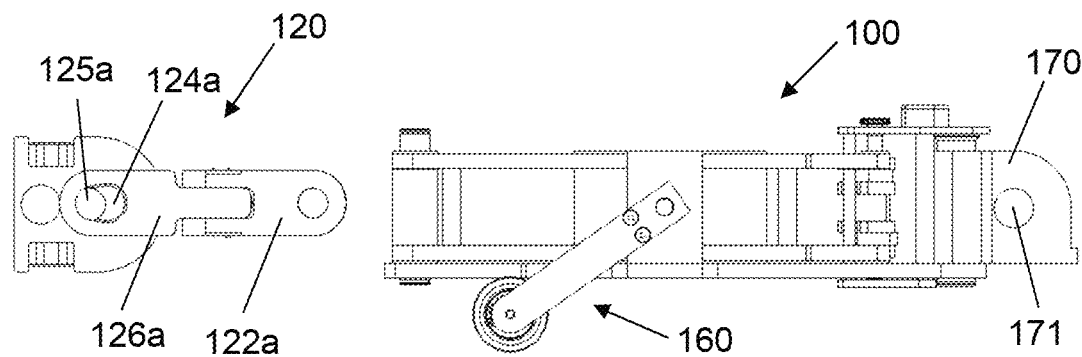
FIG. 13 is a side view of the extraction assembly shown in FIG. 12.

FIGS. 11 to 13 show the extraction parachute release device 140 in the open configuration whilst the coupling arrangement 120 is in the closed configuration, thereby allowing the whole coupling portion 120 to be pulled out by the drag force exerted by the extraction parachute 16. FIG. 11 shows the extraction assembly 100 when the coupling arrangement 120 is in the closed configuration before movement of the coupling arrangement 120 has occurred. FIGS. 12 and 13 show when the coupling arrangement 120 is released by the jaws 143 of the extraction parachute release device 140 and the coupling arrangement 120 has exited the main body 103 of the extraction assembly 100.

When the lever arm 161 of the first drop arm 160 pivots under the bias of the bias member 167, the coupling device 130 puts the coupling arrangement 120 in the closed configuration. This occurs at the first predetermined moment described above. After that, the extraction parachute release device 140 is switched from the closed configuration to the open configuration at the second predetermined moment described above. Thus, FIG. 11 shows the state of the extraction assembly 100 immediately after the second predetermined moment as the fore end 12 of the platform 11 leaves the aircraft 1. The coupling arrangement 120 is no longer captive by the extraction parachute release device 140 and is pulled from the main body 103 of the extraction assembly 100 by the drag force from the extraction parachute 16, as shown by FIGS. 12 and 13. Release of the first coupling portion 121 whilst coupled to the second coupling portion 122 is representative of the normal operation as described above. The coupled first and second coupling portions 121, 122 of the coupling arrangement 120 leave the main body 103 of the extraction assembly 100 in unison. When the main parachute deployment line 15 is coupled to the second coupling portion 122, the extraction parachute 16 deploys the main parachute 13 under the drag force on the extraction parachute 16 acting via the withdrawn coupling arrangement 120. Opening of the main parachute 13 enables the platform 11 and cargo 3 to be carried to ground.

The arrangement of the extraction parachute release device 140 is such that the jaws 143 will continue to pivot back-and-forth about the respective pivot 144. This can occur as a result of the set of central lever arms 151 continuing to spin about their pivot 152. This allows energy transmitted to the extraction parachute release device 140 to be dissipated safely by the extraction parachute release device 140, compared to limiting the movement of the jaws 143 by a hard stop.

While referring to FIG. 9, the mounting bracket 17 is shown pivotally mounted to the main body 103 of the extraction assembly 100 by a second pivotal coupling 172. The second pivotal coupling 172 provides a second degree of freedom and enables the extraction assembly 100 to move relative to the platform 11 in a second direction corresponding to a horizontal direction.

FIGS. 15 to 20 show the extraction parachute release assembly 200 in more detail. The extraction parachute release assembly 200 acts as a trigger device for the extraction parachute release device 140. The extraction parachute release assembly 200 causes an inner force transmitting line 202 of the Bowden cable which forms the extraction parachute release assembly line 201 to be pulled relative to the outer sleeve 203. The inner force transmitting line 202 in turn pulls the activation arm 157 to move the extraction parachute release device 140 to the open configuration.

The extraction parachute release assembly 200 comprises a housing 204, a trigger assembly 210, a first trigger release assembly 230, and a second trigger release assembly 250.

The trigger assembly 210 comprises a trigger spring 211 which is held in a chamber 212 in the housing 204. A releasable member in the form of a coupling rod 213 connects at a first end to the inner force transmitting line 202 of the extraction parachute release assembly line 201. The coupling rod 213 passes into the chamber 212 and through the trigger spring 211. The trigger spring 211 is a compression spring which urges against a formation 214 at a second end of the coupling rod 213 in order to bias the coupling rod 213 in a direction which pulls on the inner force transmitting line 202 of the extraction parachute release assembly line 201. The outer sleeve 203 of the extraction parachute release assembly line 201 is retained in the housing 204 such that the inner force transmitting line 202 can move relative to the outer sleeve 203 when the inner force transmitting line 202 is pulled by the coupling rod 213.

The trigger assembly 210 comprises an armed configuration. In the armed configuration, the coupling rod 213 in an armed position. The coupling rod 213 comprises a trigger engagement surface 215 arranged to be engaged by a trigger 216. Engagement of the trigger engagement surface 215 and trigger 216 retains the coupling rod 213 in the armed position against the bias of the trigger spring 211. In the armed position, the inner force transmitting line 202 is located relative to the outer sleeve 203 such that, at the other end of the extraction parachute release assembly line 201, the activation arm 157 is not pulled and the extraction parachute release device 140 is in the closed configuration.

Movement of the trigger 216 out of engagement with the trigger engagement surface 215 releases the coupling rod 213 from the armed position and allows the trigger spring 211 to retract the coupling rod 213 into the chamber 212. The coupling rod 213 thereby pulls on the inner force transmitting line 202. This in turn moves the activation arm 157 and allows the extraction parachute release device 140 to move to the open configuration. When the coupling rod 213 has been retracted into the chamber 212 by the trigger spring 211, the coupling rod 213 can be said to be in a discharged position and the trigger assembly 210 can be said to be in a discharged configuration.

The trigger 216 is pivotally mounted at a pivot point 217. The pivot point 217 is located between a first end and a second end of the trigger 216. The first end of the trigger 216 engages with the trigger engagement surface 215 of the coupling rod 213, whilst the second end of the trigger 216 is biased by a spring 218. The spring 218 urges the trigger 216 to rotate about the pivot point 217 in a direction which engages the first end of the trigger 216 with the trigger engagement surface 215 of the coupling rod 213.

The trigger 216 is arranged to be operated, i.e. moved out of engagement with the trigger engagement surface 215 so as to release the coupling rod 213, by the first trigger release assembly 230. The first trigger release assembly 230 comprises a drop arm 231, which will be referred to as the second drop arm 231 to help distinguish from the first drop arm 160.

The second drop arm 231 is biased by a biasing member in a similar manner to the first drop arm 160, such that a bias force urges the second drop arm 231 to rotate which in turn causes the extraction parachute release assembly 200 to pull the extraction parachute release assembly line 201 and activate the activation arms 157 via the Bowden cable. In operation, the second drop arm 231 rotates as the fore end 12 of the platform 11 leaves the aircraft 1 at the second predetermined moment discussed above.

The second drop arm 231 is pivotally mounted at a second pivot 232 and engages with a collar 233 (see FIG. 17) which is provided around the second pivot 232. The second drop arm 231 and collar 233 are connected such that they rotate together around the second pivot 232. The collar 233 forms a first cam and comprises an outer cam surface which engages with the second end of the trigger 216. The collar 233 also comprises a lever 234 which is connected to a resilient bias in the form of a spring pack 235 comprising a pair of tension springs.

The first trigger release assembly 230 has an armed position in which the second drop arm 231 extends in a forward direction 5. The spring pack 235 biases the collar 233, and in turn the second drop arm 231, in a direction which causes the collar 233 and second drop arm 231 to rotate about the second pivot 232 and away from the armed position. In the orientation shown in FIG. 15, the second drop arm 231 is biased to rotate in a clockwise direction. In the orientation shown in FIG. 16, the second drop arm 231 is biased to rotate in an anti-clockwise direction.

Prior to the platform 11 reaching the second predetermined position relative to the aircraft 1, the second drop arm 231 is held in the armed position, against the bias force applied by the spring pack 235, by engaging with rails which run along the floor of the cargo bay of the aircraft 1. The engagement with the rails prevents rotation of the second drop arm 231 around the second pivot 232. In alternative embodiments, the second drop arm 231 could engage with a different surface, provided the second drop arm 231 is held in the armed position until the platform 11 reaches the second predetermined position.

When the platform 11 reaches the second predetermined position (at the second predetermined moment) during a drag force event, a distance between the rails (or structure with which the second drop arm 231 is engaged) and the extraction parachute release assembly 200 increases and the second drop arm 231 is able to rotate about the second pivot 232 under the bias force of the spring pack 235. The second drop arm 231 rotates until the second drop arm 231 reaches a discharged position at which there is a stop to prevent further rotation of the second drop arm 231.

When rotating to the discharged position, the second drop arm 231 passes a latch 236 (see FIG. 16) which holds the second drop arm 231 in the discharged position. The latch 235 is in the form of a sprung pin with a chamfered edge which depresses when the second drop arm 231 passes it. In the embodiment shown, in the discharged position the second drop arm 231 extends in an aft direction, after having rotated approximately 180 degrees. The second drop arm 231 also does not protrude downward below the housing 204, and is thereby at least partly protected from impact with the ground.

The outer cam surface of the collar 233 is shaped such that, upon rotation of the second drop arm 231 from the armed position to the discharged position, the outer cam surface pushes the second end of the trigger 216 against the spring 218. This operates the trigger 216. Provided that the trigger assembly 210 is armed, the first end of the trigger 216 is caused to move out of engagement with the trigger engagement surface 215 of the coupling rod 213. The coupling rod 213 can then move to the discharged position and pull the inner force transmitting line 202. This in turn moves the activation arm 157 and allows the extraction parachute release device 140 to move to the open configuration.

The trigger 216 is also arranged to be operated, i.e. moved out of engagement with the trigger engagement surface 215 so as to release the coupling rod 213, by the second trigger release assembly 250. The second trigger release assembly 250 is in turn operated by the jettison release assembly 300. Operating the jettison release assembly 300 causes an inner force transmitting line 302 of the jettison release assembly line 301 to be pulled relative to an outer sleeve 303 of the jettison release assembly line 301.

The second trigger release assembly 250 comprises a first latch part (e.g. a formation) in the form of a hook 251 which is slidable within a channel defined in a sub-housing 259. The sub-housing 259 is provided within housing 204. Slots 252 (see FIG. 19) run along the length of the channel. The hook 251 comprises two pairs of laterally extending pins 253 which are received in the slots 252 to guide movement of the hook 251 within the channel. A compression spring 254 is also housed within the channel. The hook 251 is biased by a compression spring 254 towards a first end of the channel.

In alternative embodiments, the hook comprises two parts linked by a pivot, and a pair of the pins 253 is provided on each side of the pivot. This may increase the flexibility of the hook 251 and help it side within the channel.

The hook 251 is connected to an end of the inner force transmitting line 302 of the jettison release assembly line 301. The inner force transmitting line 302 passes through the compression spring 254 before connecting to the hook 251. The outer sleeve 303 of the jettison release assembly line 301 is mounted to the housing 204. When the inner force transmitting line 302 is pulled relative to the outer sleeve 303 by the jettison release assembly 300, a release force pulls the hook 251 against the bias of the spring 254 towards a second end of the channel.

The channel comprises a first portion in which the channel (and thus the slots 252) extend in a first direction, and a second portion in which the channel (and thus the slots 252) extend in a second direction. The first direction and second direction are not parallel to each other. In the embodiment shown, the first direction and second direction are at approximately 45 degrees to each other. The two pairs of pins 253 guide the hook 251 such that the hook 251 is in a first orientation as it travels along the first portion of the channel, and in a second orientation when it travels along the second portion of the channel.

The second trigger release assembly 250 further comprises a linkage 255. A first end of the linkage 255 comprises a second latch part (e.g. a corresponding formation) in the form of a pin 256. When the hook 251 is in the first portion of the channel and the hook 251 is in the first orientation, the hook 251 cannot engage the pin 256. When the hook 251 is pulled against the bias of the spring 254 along the second portion of the channel, the hook 251 engages with the pin 256. Puling the hook 251 further towards the second end of the channel thereby pulls the linkage 255.

The second trigger release assembly 250 further comprises a second collar 257 which is rotatably mounted at the second pivot 232. The second collar 257 forms a second cam and comprises an outer cam surface which engages with a second end of the trigger 216. The second collar 257 also comprises a lever 258. A second end of the linkage 255 is arranged to slide within a slot in the lever 258. When the linkage 255 is pulled by the hook 251 along the second portion of the channel, the linkage 255 in turn acts on the lever 258 and causes the second collar 257 to rotate about the second pivot 232.

The hook 251, linkage 255 and lever 258 form a force transfer assembly between the inner force transmitting cable 302 and the second collar 257. The hook 251 and pin 256 together form a latch which engages when a release force is applied via the inner force transmitting line 302 of the jettison assembly line 301. When the latch engages, the release force can be transferred through the latch and force transfer assembly to the second collar 257.

The outer cam surface of the second collar 257 is shaped such that, when the linkage 255 is pulled by the hook 251, the outer cam surface pushes the second end of the trigger 216 against the spring 218. This operates the trigger 216. Provided that the trigger assembly 210 is armed, the first end of the trigger 216 is caused to move out of engagement with the trigger engagement surface 215 of the coupling rod 213. The coupling rod 213 can then move to the discharged position and pull the inner force transmitting line 202. This in turn moves the activation arm 157 and allows the extraction parachute release device 140 to move to the open configuration.

The extraction parachute release assembly 200 comprises a first assembly and a second assembly. The extraction parachute release assembly 200 is arranged such that the first assembly and the second assembly can be decoupled, wherein the first assembly remains coupled to the platform 11 and the second assembly remains in the aircraft 1 when the platform 11 leaves the aircraft 1. The first assembly comprises the housing 204 with an opening 205. The second assembly comprises a latch mechanism having a cam 262. The cam 262 extends through the opening 205 and engages with the housing 204 until the first assembly is decoupled from the second assembly.

The second trigger release assembly 250 comprises two parts, the first part comprises the linkage 255 and the second collar 257. The first part is mounted to the housing 204 and stays with the remainder of the extraction parachute release assembly 200 throughout a drag force event. The first part and the remainder of the extraction parachute release assembly 200 provide the above mentioned first assembly of the extraction parachute release assembly 200.

Figure 19:
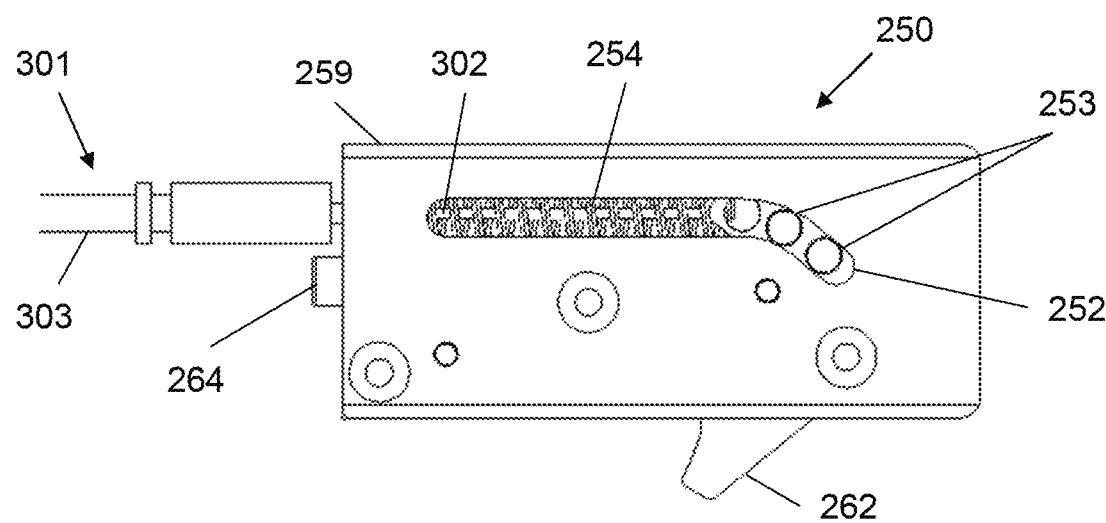
FIG. 19 is a first side view of a sub-assembly of the extraction parachute release assembly according to the first embodiment.
Figure 20:
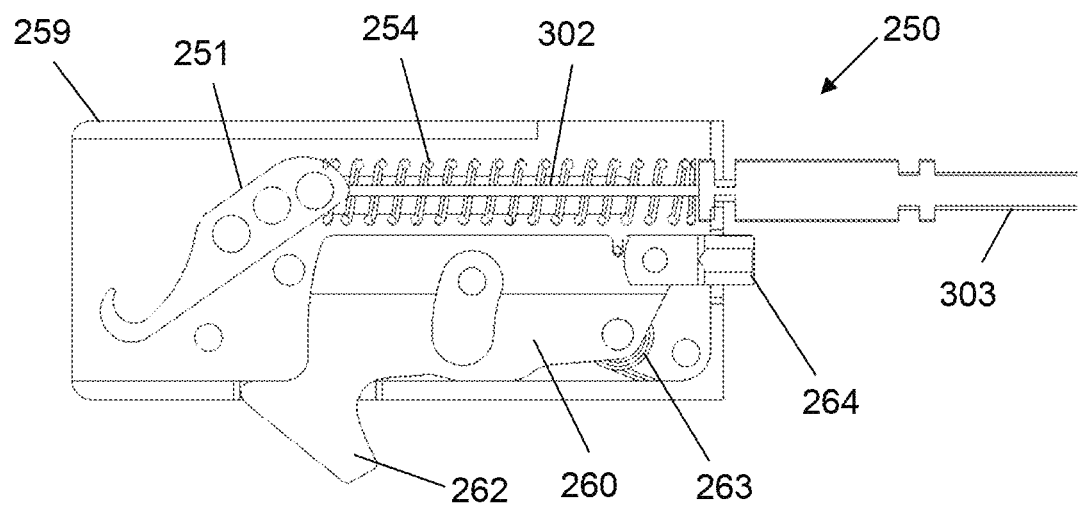
FIG. 20 is a second side view of the sub-assembly of the extraction parachute release assembly.

The second part of the second trigger release assembly 250 provides the above mentioned second assembly of the extraction parachute release assembly 200. The second part comprises the sub-housing 259, the hook 251, the spring 254 and the latch mechanism. The second part is attached to the aircraft 1. Under normal operation the second part will disconnect from the remainder of the extraction parachute release assembly 200 and will stay with the aircraft 1. FIGS. 19 and 20 show the second part of the second trigger release assembly 250 in isolation.

The latch mechanism provides the releasable connection to the housing 204. The latch mechanism comprises a latch 260 which is pivotally mounted to a sub-housing 259 at pivot point 261. The latch 260 comprises the cam 262. The latch 260 is biased by a torsion spring 263 to a position in which the cam 262 extends through the opening 205 in the housing 204. Prior to a drag force event, the cam 262 extends through the opening 205 in order to retain the sub-housing 259 within the housing 204.

A first end of a lanyard (not shown) attaches to lanyard connection component 264 which pivotally connects to the latch 206. In use, a second end of the lanyard is attached to a fixed point in the aircraft 1. The lanyard has a length such that, after the platform 11 has moved from its initial position, but before the platform 11 reaches the second predetermined position, the lanyard goes taught. When the lanyard goes taught, the lanyard pulls the latch 260 and causes it to rotate about the pivot point 261 and against the bias of the torsion spring 263 such that the cam 262 no longer extends through the opening 205 in the housing 204.

Under normal operation of the aerial delivery apparatus, the jettison release assembly 300 is not operated, and the inner force transmitting line 302 of the jettison release assembly line 301 is not pulled. The hook 251 therefore remains at the first end of the channel. When the platform 11 reaches a position (before the second predetermined position) in which the lanyard goes taught, the latch 260 is pulled and the second part of the second trigger release assembly 250 is thereby released from the remainder of the extraction parachute release assembly 200. The platform 11 and the remainder of the extraction parachute release assembly 200 then continue towards the exit of the aircraft 1 and at the second predetermined position the trigger 216 will be operated by the first trigger release assembly 230. As a consequence, the extraction parachute release device 140 is moved to the open configuration.

In an emergency situation which necessitates jettison of the extraction parachute 16, (and before the platform reaches a position in which the lanyard goes taught) the jettison release assembly 300 is operated, for example by a load master. The inner force transmitting line 302 of the jettison release assembly line 301 is therefore pulled. The hook 251 is therefore pulled towards the second end of the channel in the sub-housing 259 and engages the pin 256. In turn, the linkage 255 is pulled, the second collar 257 is rotated and the trigger 216 is operated. Thus the trigger 216 is operated by the second trigger release assembly 250. As a consequence, the extraction parachute release device 140 is moved to the open configuration.

In alternative embodiments, the force transfer assembly is dispensed with and the second cam of the second trigger release assembly is pivotally mounted to the sub-housing 259. The inner force transmitting line 302 of the jettison release assembly line 301 is directly connected to the second cam. The second end of the trigger 216 extends to the sub housing 259. When the inner force transmitting line 302 is pulled, the second cam is rotated into engagement with the second end of the trigger 216 and the trigger 216 is operated.

The extraction parachute release assembly 200 further comprises an arming device 270 for arming the trigger assembly 210. The arming device 270 comprises an arming lever 271 which is pivotally mounted to a third pivot point 272 (which is shared by the spring pack 235). The arming lever 271 is arranged, when rotated about the third pivot point 272, in the anti-clockwise direction shown in FIG. 15, to engage with laterally extending projections 274 on the coupling rod 213. When the coupling rod 213 is in the discharged position, the arming lever 271 can be used to push, via the laterally extending projections 274, the coupling rod 213 back to the armed position. When the coupling rod 213 reaches the armed position, the trigger 216 engages and the arming lever 271 can be released.

The arming lever 271 is connected to an arming handle 275 arranged to be held by a user. The arming handle 275 is pivotally mounted to the arming lever 271 at a fourth pivot point 276. The pivot allows the arming handle 275 to adopt a stowed position, and be rotated in a direction 277 to an engaged position in which the arming handle 275 pushes against the arming lever 271, wherein further movement rotates the arming lever 271 about the third pivot point 272.

Figure 15:
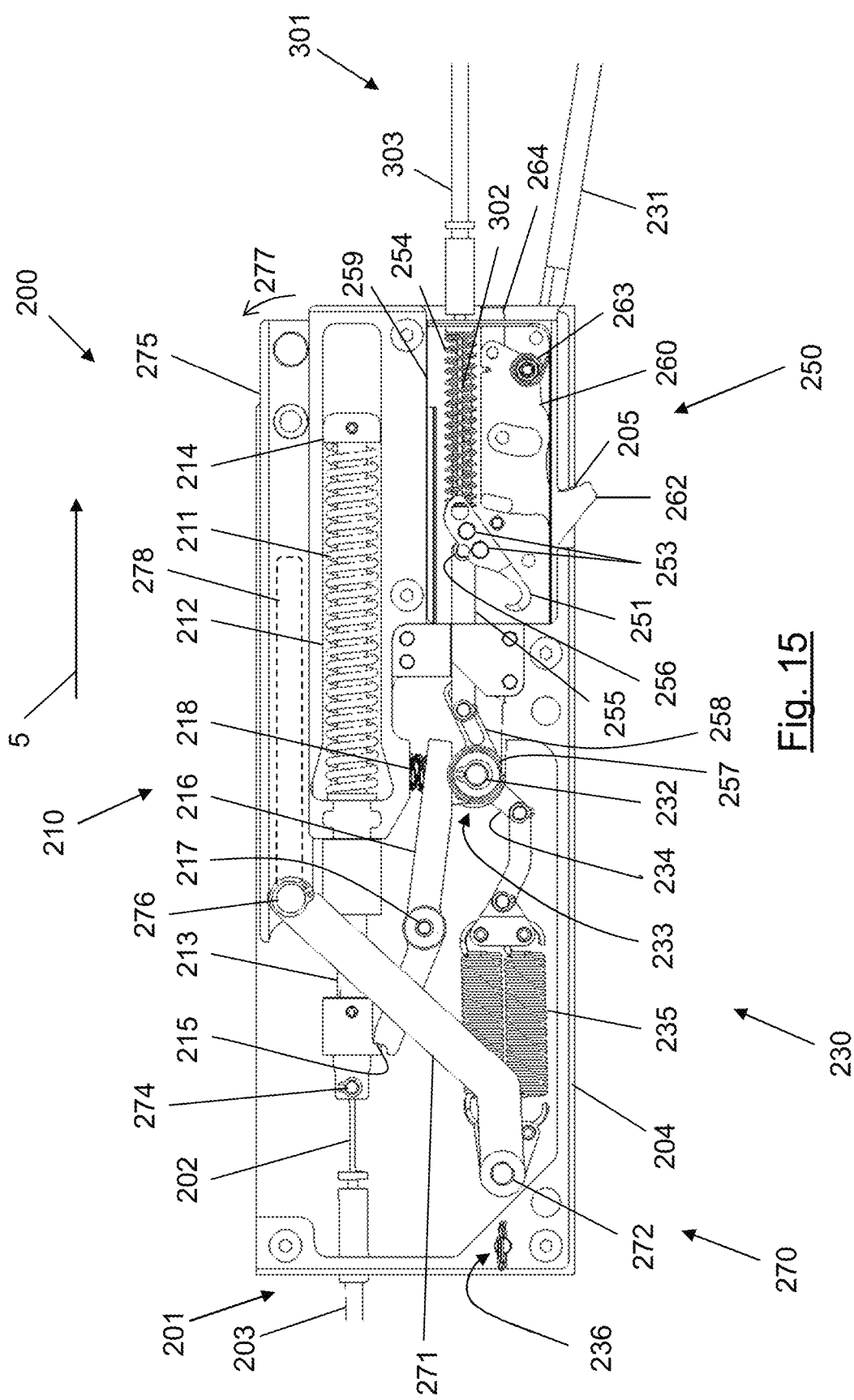
FIG. 15 is a side view of the internals of an extraction parachute release assembly.
Figure 16:
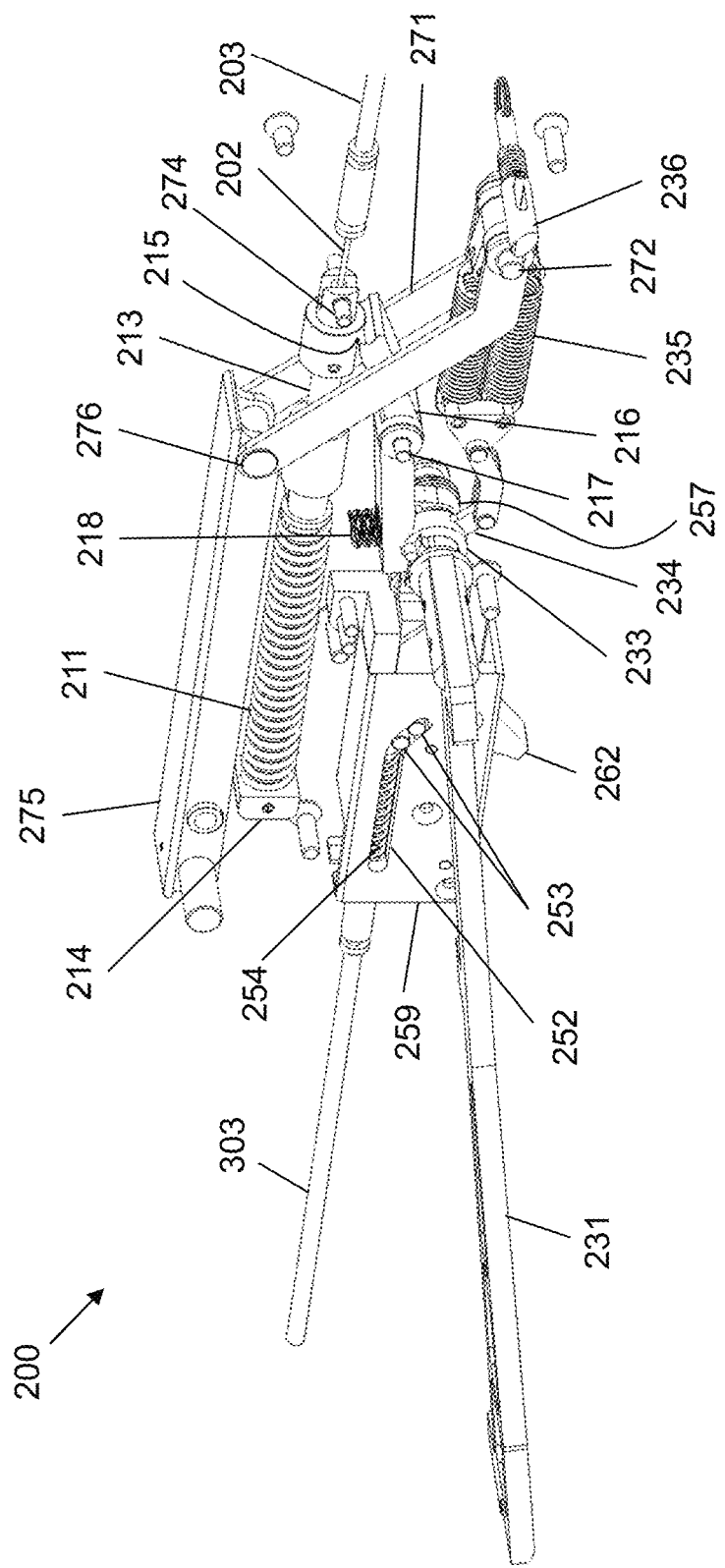
FIG. 16 is a perspective view of internals of the extraction parachute release assembly according to the first embodiment.
Figure 17:
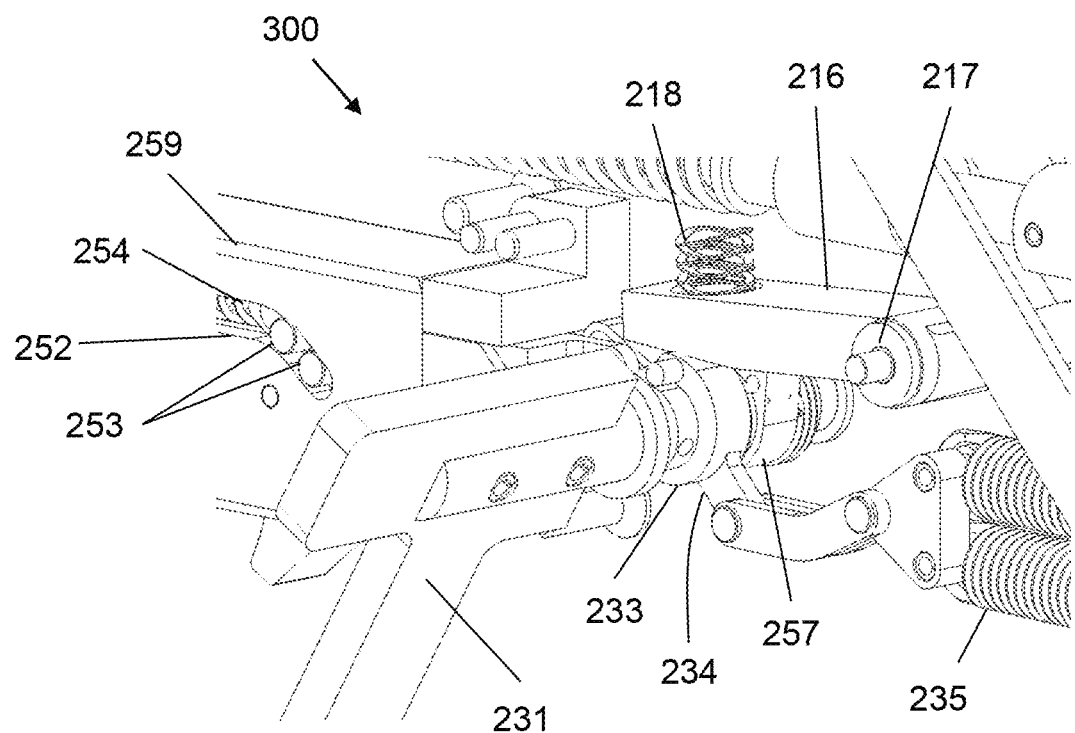
FIG. 17 is a first enlargement of the internals of the extraction parachute release assembly.
Figure 18:
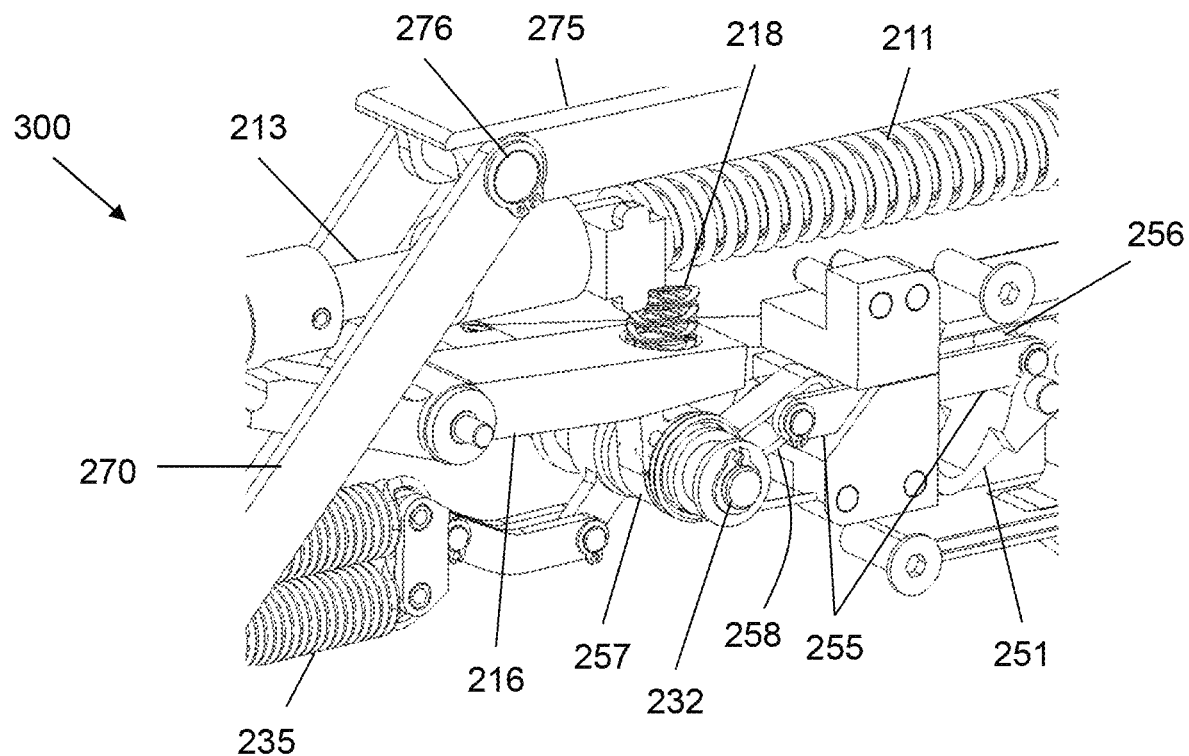
FIG. 18 is a second enlargement of the internals of the extraction parachute release assembly.

The fourth pivot point 276 is provided in a slot 278 which runs in a longitudinal direction along the length of the arming handle 275. The slot allows the arming handle 275 to be slid in the forward-aft direction relative to arming lever 271. In a stowed position, the arming handle 275 is fully aft and the configuration is most compact. In a use position, the arming handle 275 is fully forward (as shown in FIG. 15) to maximise mechanical advantage when the arming handle 275 and arming lever 271 are rotated. The arming handle 275 may be retained in the stowed position by a retaining means, for example by ball detents.

As explained above, the extraction parachute release assembly 200 is arranged to operate by activation of the jettison release assembly line 301 by the jettison release assembly 300, or by the second drop arm 231.

Figure 21:
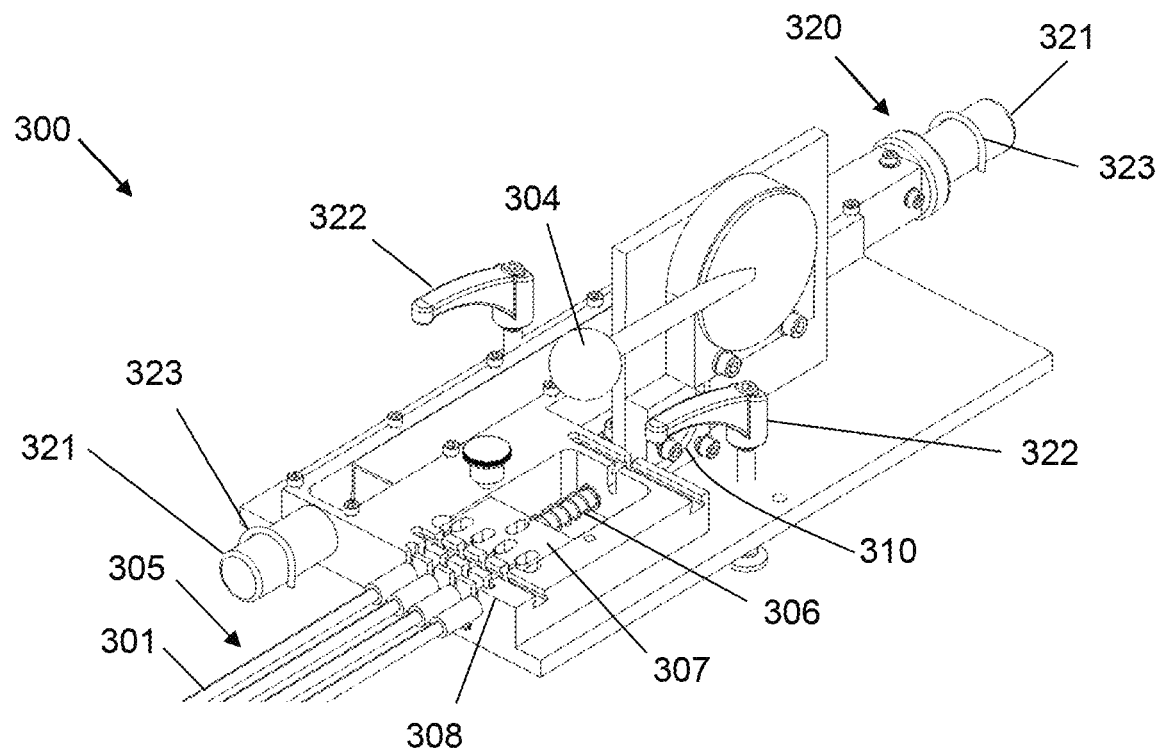
FIG. 21 is a first perspective view of a jettison release assembly according to the first embodiment.
Figure 22:
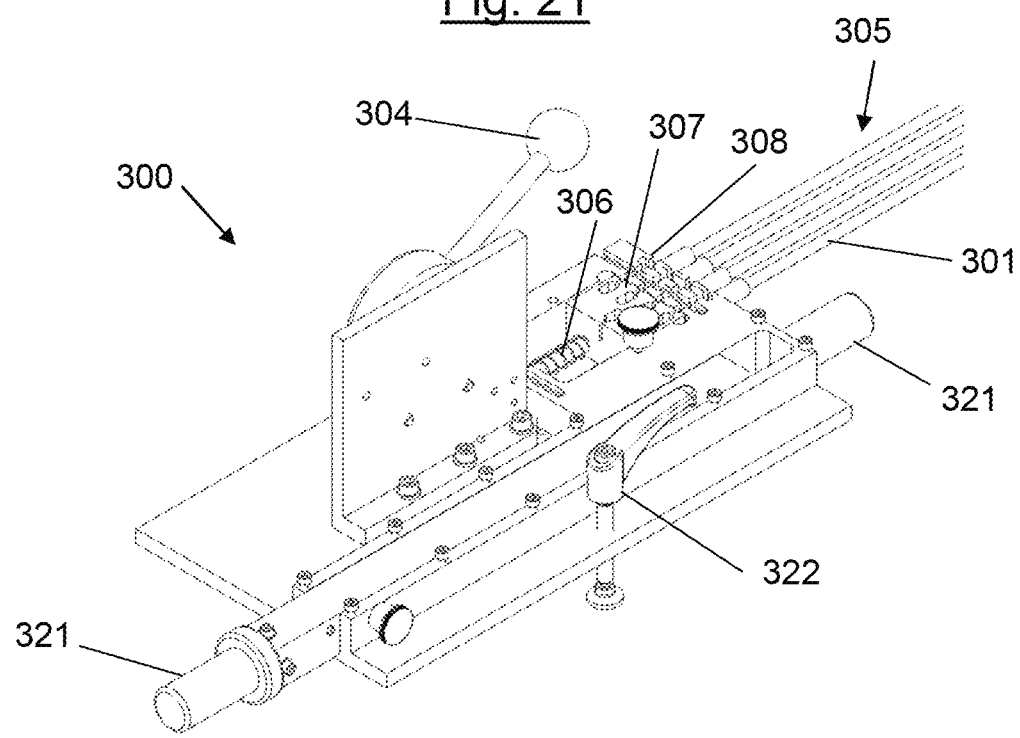
FIG. 22 is a second perspective view of the jettison release assembly according to the first embodiment.
Figure 23:
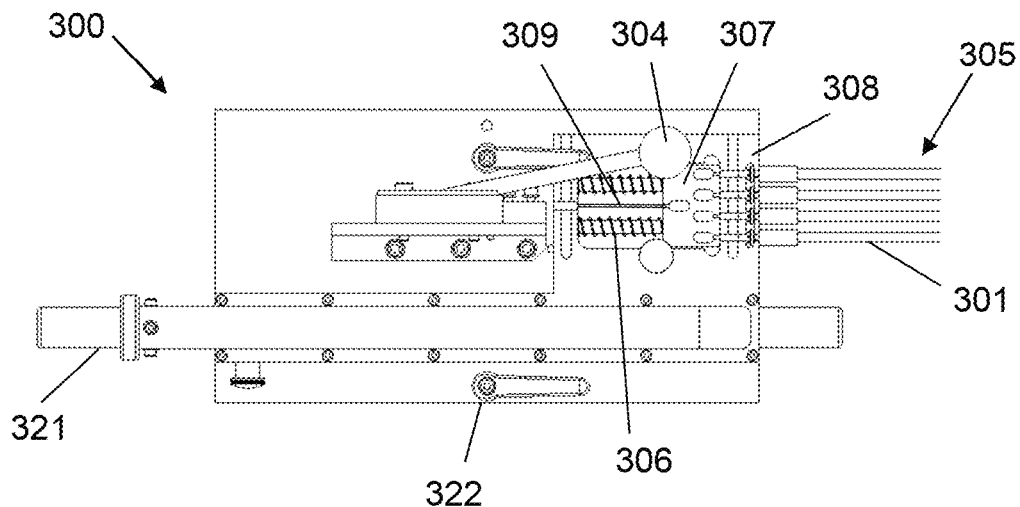
FIG. 23 is a top plan view of the jettison release assembly according to the first embodiment.

FIGS. 21 to 23 show the jettison release assembly 300 in more detail. The jettison release assembly 300 comprises a jettison handle 304, a jettison release assembly line array 305 and a biasing member in the form of a spring 306 to resist movement of the jettison handle 304. The jettison release assembly line array 305 comprises the jettison release assembly line 301 and three other jettison release assembly lines associated with other platforms in the aircraft 1.

An end of the inner force transmitting line 302 of each jettison release assembly line 301 is retained in a connecting block 307. The outer sleeve 303 of each jettison release assembly line 301 is retained in a housing 308 proximate the connecting block 307. The connecting block 307 is slidably mounted and is biased by the spring 306 to a first position. The jettison handle 304 is connected to the connecting block 307 via a jettison cable 309 (not shown in FIGS. 21 and 22) which is provided in arcuate channel 310. The jettison handle 304 is arranged such that rotation of the jettison handle 304 away from a first position (in a clockwise direction in the orientation shown in FIG. 21) pulls the jettison cable 309, which in turn pulls the connecting block 307 against the bias of the spring 306.

By pulling the connecting block 307 against the bias of the spring 306, each inner force transmitting line 302 is pulled relative to the outer sleeve 303. As a consequence, and provided that the respective platform 11 has not yet reached the second predetermined position, the respective second trigger release assembly 250 will operate the respective trigger 216 of the respective extraction parachute release assembly 200. Accordingly, operation of the jettison handle 304, for example by the loadmaster, causes the jettison release assembly line array 305 to jettison a respective extraction parachute, such as the extraction parachute 16 discussed above.

Providing a single jettison handle 304 which serves a plurality of jettison release assembly lines 301 may be beneficial because it reduces the risk of a user pulling the incorrect handle during an emergency situation. It will however be appreciated that there may be a need to re-arm each extraction parachute release assembly 200 after the jettison handle 304 is pulled. In alternative embodiments, a plurality of jettison handles are provided, each jettison handle serving a single jettison release assembly line 301.

In alternative embodiments, the/each jettison handle 304 comprises a jettison handle lock configured to lock the jettison handle 304 in the first position so as to reduce the risk of inadvertent operation of the jettison handle 304. For example, the jettison handle lock may comprise a button which is required to be depressed before the jettison handle 304 can be rotated, for example in a manner akin to a motor vehicle manual handbrake.

The jettison release assembly 300 further comprises a fastening assembly 320 comprising two opposed bosses 321 and two clamps 322. The bosses 321 are each sized to be received in a D-ring 323 of the cargo handling system of the aircraft 1. A first boss 321 is telescopically mounted such that the distance between the two bosses 321 can be changed to accommodate different D-ring spacing. Once the bosses 321 have been received in a respective D-ring 323, the clamps 322 can be extended downwards and pressed against the underlying structure so as to push the bosses 321 against the D-rings 323 and thereby clamp the jettison release assembly 300 in position.

The aerial delivery system 10 operates with a "normally open connection" such that the coupling arrangement 120 is in the open configuration until required. This may enable the aerial delivery system 10 to improve safety, especially for the crew, and reduce the risk of aircraft 1 failure. The aerial delivery system 10 may be shown to have reduced bulkiness compared to previous systems and/or offer improved weight and/or space savings.

Figure 24:
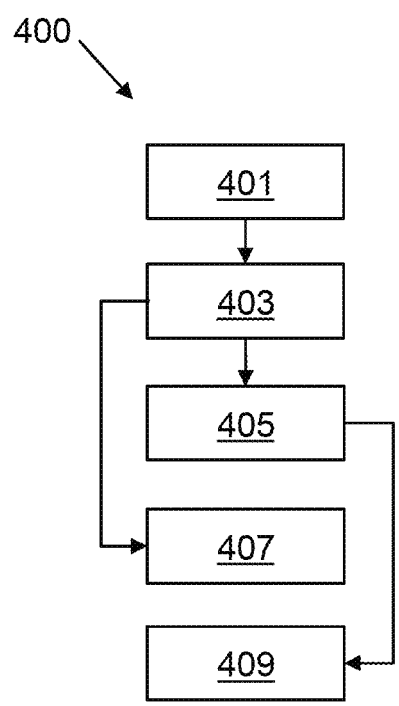
FIG. 24 is a flow diagram illustrating a method of operating an aerial delivery system according to a further embodiment.

FIG. 24 shows a method 400 of operating an aerial delivery system, such as the aerial delivery system 10 of the first embodiment. A drag force event 401 comprises generating a drag force by an extraction parachute and exerting the drag force on a platform within an aircraft, wherein the platform is arranged to carry cargo. The aerial delivery system determines 403 whether to uncouple or couple a main parachute deployment line of a main parachute to the extraction parachute via which the drag force is exerted by the extraction parachute. The main parachute in this example is arranged to carry the platform to ground when the platform is airborne and has exited the aircraft. The main parachute deployment line in this example is arranged to deploy the main parachute when the platform has exited the aircraft and is airborne.

Optionally, the method 400 comprises determining to couple and coupling 405 the main parachute deployment line to the extraction parachute via which the drag force is continued to be exerted on the platform by the extraction parachute.

Optionally, coupling 405 the main parachute deployment line occurs once the drag force is sufficient to move the platform within the aircraft towards an open exit of the aircraft.

Optionally, coupling 405 the main parachute deployment line occurs when the platform has moved to a predetermined location within the aircraft by the drag force.

Optionally, coupling 405 the main parachute deployment line occurs once a coupling arrangement switches from an open configuration to a closed configuration, wherein in the open configuration the main parachute deployment line is uncoupled from the extraction parachute, and in the closed configuration the main parachute deployment line is coupled to the extraction parachute.

Optionally, the method 400 comprises releasing 409 the extraction parachute from the platform after performing the step of determining 403 whether to uncouple or couple the main parachute deployment line to the extraction parachute.

Optionally, the method 400 comprises, after coupling 405 the main parachute deployment line, releasing 409 the extraction parachute from the platform such that the main parachute is deployed by the drag force generated by the extraction parachute via the extraction assembly pulling on the main parachute deployment line.

Optionally, the method 400 comprises, when the main parachute deployment line is uncoupled from the extraction parachute, jettisoning 407 the extraction parachute by releasing the extraction parachute from the platform.

Optionally, the drag force event 401 comprises transmitting the drag force along a primary load path to the platform such that no other load path exists along which to transmit the drag force from the extraction parachute to the platform. The primary load path may be referred to as a unitary load path.

The determining 403 whether to uncouple may be a passive determination. For example, determining 403 to uncouple may comprise a lack of input (for example, non-switching of the coupling mechanism from the open configuration) as opposed to a determining 403 to couple, which may comprise a positive input (for example, switching of the coupling mechanism from the open configuration to the closed configuration).

Figure 25:
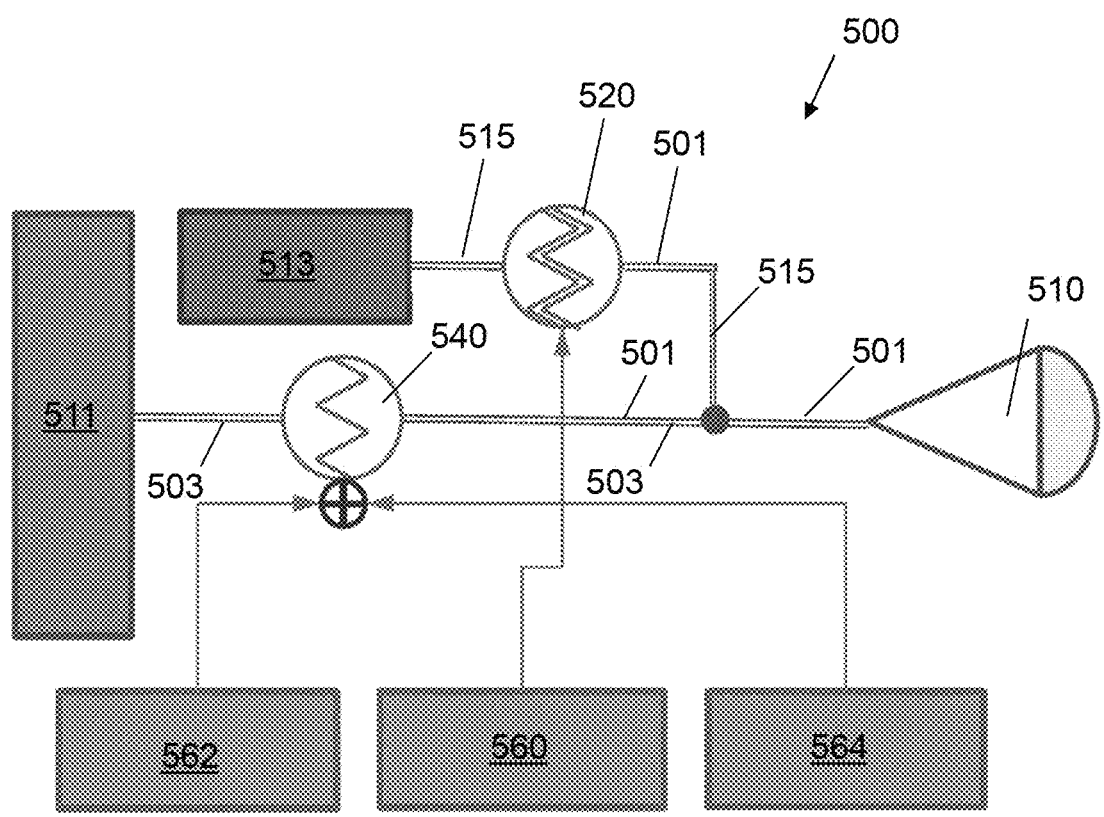
FIG. 25 is a schematic diagram showing an aerial delivery system according to a yet further embodiment.

FIG. 25 shows a schematic representation of a further embodiment. Thus, there is shown an aerial delivery system 500 for parachuting a platform 511 from an aircraft (not shown). The platform 511 can thus carry cargo from the aircraft to ground. There is a main parachute 513 for carrying the platform 511 once it has exited the aircraft and is airborne and an extraction parachute 510 for both moving the platform 511 out of the aircraft and for causing the main parachute 513 to be deployed. Possible load paths 501 are shown in FIG. 24 with a double line. These load paths 501 are provided by a main parachute deployment line 515 which enables the extraction parachute 510 to cause deployment of the main parachute 513 and an extraction line 503 for linking the extraction parachute 510 and the platform 511.

There is a first (normally open) coupling arrangement 520 which breaks or makes the load path 501 defined by the main parachute deployment line 515. There is a second (normally closed) coupling arrangement 540 which breaks or makes the load path 501 defined by the extraction line 503.

The system 500 is arranged such that when the extraction parachute 510 is initially deployed the extraction parachute 510 causes a drag force on the platform 511, which causes the platform 511 to move towards its exit from the aircraft. At this time, the first coupling arrangement 520 is in its open configuration so that there is no possibility of a premature deployment of the main parachute 513 while the platform 511 is still in the aircraft. Only when a first drop arm 560 is activated by the platform 511 passing a point in the aircraft as the platform 511 exits the aircraft does the first coupling arrangement 520 switch to the closed configuration and couple the main parachute deployment line 515 to the extraction parachute 510. In normal operation, a second drop arm 562 is subsequently activated which causes the second coupling arrangement 540 to open and thus break the load path 501 of the extraction line 503, thus releasing the extraction parachute 510. A safety lever 564 is provided to allow flight crew to cause manual jettison of the extraction parachute 510, if so required.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Although the coupling arrangement 120, 520 is described with an open configuration and a closed configuration, a skilled person will understand that these arrangements refer to a first arrangement and a second arrangement, respectively and the terms "open" and "closed" correspond to being unlocked/unsecured and locked/secured with respect to the main parachute deployment line.

Although only one main parachute 13, 513 is referred to above, the skilled person will appreciate that more than one main parachute may be deployed when the main parachute deployment line 15, 515 is pulled by the extraction parachute under the drag force. For example, the main parachute 13, 513 may comprise two or three parachutes. Additionally, and/or alternatively, only one extraction parachute 16, 510 is referred to above, the skilled person will appreciate that more than one extraction may be used, for example, the extraction parachute 16 may comprise two or three parachutes.

In the extraction assembly 100 according to the first embodiment of the invention, the coupling device 130 is actuated by a bias member rotating a drop arm. This may be advantageous because it is a self-contained and mechanical mechanism, but it does not need to be the case. In alternative embodiments, the coupling device may be actuated by, for example, an electromechanical actuator, for example in response to a signal, for example sent by a sensor (e.g. provided on the extraction assembly) sensing that the platform has reached the first predetermined relative position of the platform and aircraft.

In the extraction assembly 100 according to the first embodiment of the invention, the coupling arrangement 120 and coupling device 130 are initially provided together in the same location, in particular, they are attached to and/or supported by the body of the extraction assembly. This may be advantageous because it may provide a more compact extraction assembly, but it does not need to be the case. It could be that the coupling arrangement is provided in a different location to the coupling device. For example, the coupling device could be mounted to the aircraft 1, and the coupling device could cause the coupling to close when the coupling arrangement passes the coupling device during extraction of the platform 11.

In the extraction assembly 100 according to the first embodiment of the invention, all parts of the coupling arrangement 120 and extraction parachute release device 140 are initially provided together in the same location, in particular they are attached to and/or supported by the body of the extraction assembly. Furthermore, the first coupling portion 121 provides a body which is engaged by both the second coupling portion and by the extraction parachute release device. This may be advantageous because it may provide a more compact extraction assembly, but it does not need to be the case. It could be that the first coupling portion of the coupling arrangement comprises a first part and a second part which are spaced apart. For example, the first part and the second part could be connected via a line (e.g. a strop). The first part could be retained by the extraction parachute release device, and the second part could be couplable to the second coupling portion.

In the extraction assembly 100 according to the first embodiment of the invention, the extraction parachute release device 140 is actuated in response to a release force transmitted by a Bowden cable. This may be advantageous because it does not require the use of electronics and/or pyrotechnics, but it does not need to be the case. In alternative embodiments, the extraction parachute release device may be actuated by, for example, an electromechanical actuator, for example in response to a signal, for example sent by a sensor (e.g. on an extraction parachute release assembly) sensing that the platform has reached the second predetermined relative position of the platform and aircraft.

In some embodiments, the second trigger release assembly 250 and the jettison release assembly 300 are optional parts of the aerial delivery system 10. In some embodiments, the second trigger release assembly 250 and jettison release assembly 300 are omitted all together. In such cases, there may be provided alternative means of jettisoning the extraction parachute in an emergency situation, for example using a jettison device of the prior art (e.g. a pyrotechnic charge based device), and for example being provided between the coupling arrangement 120 and the extraction parachute 16.

There may be defined an extraction mode of the extraction parachute 16 in which the extraction parachute 16 is responsible for extracting the platform 11 from the aircraft 1, and a released mode in which the extraction parachute 13 has been released from the platform 11 so that the extraction parachute 16 is no longer responsible for extracting the platform 11 and the extraction parachute 16 deploys the main parachute 13.

There may be embodiments in which, during normal use, the extraction parachute 16 is not completely disconnected from the platform 11 after the first releasable coupling 111 has opened and the main parachute 13 has deployed. For example, a connection between the extraction parachute 13 and the platform 11 may remain so that the extraction parachute 16 descends with the platform 11 and it is easier to recover. Even if that were the case, the extraction parachute 16 would, in the context of the present invention, still be considered to be 'released' after the first releasable coupling 111 has opened.

It will be understood by the skilled person that the term "drag force" corresponds to a force generated by an amount of drag caused by the extraction parachute 16 acting on the aircraft 1 when in-flight and the platform 11 is static relative to the aircraft 1. When the platform 11 moves relative to the aircraft 1, the drag on the aircraft may be reduced as a consequence of the platform 10 movement. The force generated by the extraction parachute 16 and exerted on the platform 11, or the main parachute deployment line 15 when the extraction parachute 16 is decoupled from the platform 11, may also not be generating drag on the aircraft 1. However, for consistency, the term "drag force" is used to refer to the force generated by the extraction parachute 16 that may cause drag on the aircraft 1 and/or that may cause an extraction force with a lower or no impact on drag on the aircraft 1.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aerial delivery system for aerial delivery of cargo from an aircraft, the cargo being provided on an aerial delivery platform, the aerial delivery system comprising:
    an extraction assembly for transmitting to the platform a drag force generated by an extraction parachute, the extraction assembly comprising:
    a coupling arrangement configured to couple a main parachute deployment line to the extraction parachute, the coupling arrangement being switchable from an open configuration in which the main parachute deployment line is uncoupled from the extraction parachute to a closed configuration in which the main parachute deployment line is coupled to the extraction parachute;
    a coupling device configured to switch the coupling arrangement from the open configuration to the closed configuration in response to the platform moving to a first predetermined position relative to the aircraft; and
    an extraction parachute release device configured to uncouple the extraction parachute from the platform;
    wherein the aerial delivery system comprises an extraction parachute release assembly arranged to cause the extraction parachute release device to uncouple the extraction parachute from the platform in response to the platform moving to a second predetermined position relative to the aircraft; and
    wherein the second predetermined position is a position reached by the platform after the platform has passed the first predetermined position.

2. The aerial delivery system according to claim 1, wherein the coupling arrangement comprises a first coupling portion coupleable to a second coupling portion,
    wherein in the open configuration of the coupling arrangement the first coupling portion is uncoupled from the second coupling portion such that the main parachute deployment line is uncoupled from the extraction parachute, and
    wherein in the closed configuration of the coupling arrangement the first coupling portion is coupled to the second coupling portion such that the main parachute deployment line is coupled to the extraction parachute.

3. The aerial delivery system according to claim 2, wherein one of the first coupling portion and the second coupling portion comprises a clasp to retain an other of the first coupling portion and the second coupling portion when the coupling arrangement is in the closed configuration and to release the other of the first coupling portion and the second coupling portion when the coupling arrangement is in the open configuration.

4. The aerial delivery system according to claim 3, wherein the extraction assembly comprises a bias arrangement to bias the clasp closed.

5. The aerial delivery system according to claim 2,
    wherein the extraction parachute release device comprises:
    a closed configuration wherein the extraction parachute release device retains the first coupling portion such that drag force generated by the extraction parachute is exerted on the platform via the first coupling portion, and
    an open configuration wherein the extraction parachute release device releases the first coupling portion such that the extraction parachute is released from the platform.

6. The aerial delivery system according to claim 5, wherein the extraction parachute release device comprises a lever assembly configured such that:
    in the closed configuration of the extraction parachute release device the lever assembly retains the first coupling portion, and
    in the open configuration of the extraction parachute release device the lever assembly releases the first coupling portion.

7. The aerial delivery system according to claim 6, wherein the lever assembly comprises a pair of pivotally mounted jaws configured to engage with the first coupling portion so as to retain the first coupling portion, and to disengage from the first coupling portion so as to release the first coupling portion.

8. The aerial delivery system according to claim 5, wherein the extraction parachute release device comprises an over centre locking device configured to lock the extraction parachute release device in the closed configuration, and to unlock so that the extraction parachute release device can move to the open configuration.

9. The aerial delivery system according to claim 1, wherein the coupling device comprises a drop arm, wherein the coupling device is arranged such that a movement of the drop arm causes the coupling arrangement to switch from the open configuration to the closed configuration.

10. The aerial delivery system according to claim 1, wherein the extraction parachute release device is configured to uncouple the extraction parachute from the platform in response to receiving a release force transmitted from the extraction parachute release assembly, optionally wherein the extraction assembly is configured to receive the release force via a cable.

11. The aerial delivery system according to claim 1,
wherein the extraction parachute release assembly comprises a drop arm, wherein the extraction parachute release assembly is configured to cause the extraction parachute release device to uncouple the extraction parachute from the platform in response to movement of the drop arm.

12. The aerial delivery system according to claim 1, wherein the extraction parachute release device is configured such that it is able to uncouple the extraction parachute from the platform when the coupling arrangement is in the open configuration such that release of the extraction parachute does not deploy the main parachute.

13. The aerial delivery system according to claim 1, wherein the extraction parachute release assembly is configured such that it is able to cause the extraction parachute release device to uncouple the extraction parachute from the platform, prior to the platform reaching the second predetermined position relative to the aircraft, in response to an input from a jettison assembly, the jettison assembly being configured to effect a user initiated jettison of the extraction parachute from the platform.

14. The aerial delivery system according to claim 13, wherein the jettison assembly comprises a jettison initiation device for operation by the user, the jettison initiation device being configured to generate a release force which is transmitted to the extraction parachute release assembly.

15. The aerial delivery system according to claim 1, wherein the extraction assembly comprises a body to which the coupling arrangement, the coupling device and the extraction parachute release device are directly attached and/or supported.

16. The aerial delivery system according to claim 15, wherein the aerial delivery system comprises a pivotal coupling configured to pivotally couple the extraction assembly to the platform.

17. An aerial delivery system according to claim 1, the aerial delivery system comprising:
the platform for supporting the cargo;
the main parachute for carrying the platform when the platform has exited the aircraft and is airborne and the main parachute is deployed;
the main parachute deployment line to deploy the main parachute; and
the extraction parachute coupled to the platform and arranged for generating the drag force and exerting the drag force on the platform.

18. A method of operating the aerial delivery system according to claim 17, the method comprising:
using the extraction parachute to generate the drag force which is exerted via the extraction assembly on the platform, the drag force initially being exerted whilst the coupling arrangement is in the open configuration such that the main parachute deployment line is uncoupled from the extraction parachute;
when the platform has moved to the first predetermined position relative to the aircraft, the coupling device switching the coupling arrangement from the open configuration to the closed configuration such that the main parachute deployment line is coupled to the extraction parachute;
when the platform has moved to the second predetermined position relative to the aircraft, the extraction parachute release assembly causing the extraction parachute release device to uncouple the extraction parachute from the platform; and
the extraction parachute deploying the main parachute via the main parachute deployment line.

19. An aerial delivery system for aerial delivery of cargo from an aircraft, the aerial delivery system comprising:
an extraction assembly comprising: a coupling device and a coupling arrangement, the coupling device being configured to switch the coupling arrangement from an open configuration in which a main parachute deployment line is uncoupled from an extraction parachute to a closed configuration in which the main parachute deployment line is coupled to the extraction parachute; and
an extraction parachute release assembly configured to cause an extraction parachute release device to uncouple the extraction parachute from the cargo;
wherein the coupling device comprises a first drop arm arranged to initially be held in a first configuration of the first drop arm by contact with an aircraft structure, wherein the coupling device is arranged to cause the coupling arrangement to switch from the open configuration to the closed configuration in response to activation of the first drop arm, the first drop arm being activated upon movement of the first drop arm from the first configuration of the first drop arm to a second configuration of the first drop arm as a position of the coupling device relative to the aircraft structure changes during extraction of the cargo from the aircraft; and
wherein the extraction parachute release assembly comprises a second drop arm arranged to initially be held in a first configuration of the second drop arm by contact with an aircraft structure, wherein the extraction parachute release assembly is configured to cause the extraction parachute release device to uncouple the extraction parachute from the cargo in response to activation of the second drop arm, the second drop arm being activated upon movement of the second drop arm from the first configuration of the second drop arm to a second configuration of the second drop arm as a position of the extraction parachute release assembly relative to the aircraft structure changes during extraction of the cargo from the aircraft;
wherein the first drop arm and the second drop arm are arranged such that the first drop arm and the second drop arm are activated at different times during extraction of the cargo from the aircraft.

20. An aerial delivery system for aerial delivery of cargo from an aircraft, the aerial delivery system comprising:
an extraction assembly comprising:
a coupling arrangement comprising a first coupling portion for connection to an extraction parachute and a second coupling portion for connection to a main parachute deployment line;

a coupling device being configured to switch the coupling arrangement from an open configuration of the coupling arrangement in which the first coupling portion is uncoupled from the second coupling portion such that the main parachute deployment line is uncoupled from the extraction parachute, to a closed configuration of the coupling arrangement in which the first coupling portion is coupled to the second coupling portion such that the main parachute deployment line is coupled to the extraction parachute upon movement of the cargo to a first position relative to the aircraft; and an extraction parachute release device configured to uncouple the extraction parachute from the cargo upon movement of the cargo to a second position relative to the aircraft prior to or after movement of the cargo to the first position, the extraction parachute release device comprising a pair of jaws mounted to a body of the extraction assembly, each one of the jaws being configured to move, relative to the body, towards and away from another of the jaws;

wherein the extraction parachute release device comprises a closed configuration of the extraction parachute release device in which in which the jaws engage with opposing sides of the first coupling portion to retain the first coupling portion such that a drag force generated by the extraction parachute is exerted on the cargo via the first coupling portion; and wherein the extraction parachute release device is movable to an open configuration of the extraction parachute release device in which the jaws are disengaged from the opposing sides of the first coupling portion to release the first coupling portion and thereby release the extraction parachute from the cargo, wherein the jaws are disengaged by moving, relative to the body, away from the first coupling portion.

* * * * *